US011868092B2

(12) United States Patent
Tombez

(10) Patent No.: US 11,868,092 B2
(45) Date of Patent: Jan. 9, 2024

(54) TIMEPIECE COMPRISING A MECHANICAL OSCILLATOR ASSOCIATED WITH A REGULATION SYSTEM

(71) Applicant: The Swatch Group Research and Development Ltd, Marin (CH)

(72) Inventor: Lionel Tombez, Bevaix (CH)

(73) Assignee: The Swatch Group Research and Development Ltd, Marin (CH)

( * ) Notice: Subject to any disclaimer, the term of this patent is extended or adjusted under 35 U.S.C. 154(b) by 1422 days.

(21) Appl. No.: 16/223,159

(22) Filed: Dec. 18, 2018

(65) Prior Publication Data
US 2019/0187625 A1     Jun. 20, 2019

(30) Foreign Application Priority Data
Dec. 20, 2017  (EP) ..................................... 17209130

(51) Int. Cl.
*G04C 11/00*     (2006.01)
*G04C 3/04*      (2006.01)
(Continued)

(52) U.S. Cl.
CPC ................. *G04C 11/00* (2013.01); *G04C 3/04* (2013.01); *G04C 3/047* (2013.01); *G04C 10/00* (2013.01); *H02M 3/07* (2013.01); *H02M 7/06* (2013.01)

(58) Field of Classification Search
CPC .......... G04C 3/16; G04C 3/165; G04C 10/00; G04C 11/00; G04C 3/04; G04C 3/047; G04F 5/10; H02M 3/07; H02M 7/06
See application file for complete search history.

(56) References Cited

U.S. PATENT DOCUMENTS 3,407,344 A * 10/1968 Bansho .................. G04C 3/069
                                                    968/479
3,487,629 A *  1/1970 Yoshifumi .............. G04C 3/065
                                                    318/132
(Continued)

FOREIGN PATENT DOCUMENTS

EP         1 241 538 A1     9/2002

OTHER PUBLICATIONS

European Search Report dated May 25, 2018 in European Application 17209130.8, filed on Dec. 20, 2017 (with English Translation of Categories of Cited Documents).

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A timepiece includes a mechanical movement with a mechanical oscillator and an electronic device for regulating the medium frequency of this mechanical oscillator. It includes an electromagnetic transducer and an electric converter which includes a power supply capacitor for powering the regulation circuit. The electromagnetic transducer is arranged to supply a voltage signal exhibiting first voltage lobes in first half-alternations and second voltage lobes in second half-alternations of the oscillations of the mechanical oscillator. The regulating device includes a load pump arranged to store momentarily electric loads which are extracted selectively in different time zones according to a time drift detected in the functioning of the mechanical oscillator relative to an auxiliary oscillator, particularly quartz-based. The electric loads extracted are rendered after a certain delay to the power supply capacitor also according to the time drift detected.

33 Claims, 11 Drawing Sheets

(51) Int. Cl.
    *G04C 10/00*    (2006.01)
    *H02M 7/06*     (2006.01)
    *H02M 3/07*     (2006.01)

(56) References Cited

U.S. PATENT DOCUMENTS

| | | | | |
|---|---|---|---|---|
| 3,538,704 | A * | 11/1970 | Toyoji | G04C 3/067 |
| | | | | 318/130 |
| 3,670,492 | A * | 6/1972 | Takamune | G04C 3/065 |
| | | | | 368/163 |
| 3,696,258 | A * | 10/1972 | Anderson | H02N 1/004 |
| | | | | 55/DIG. 39 |
| 3,803,829 | A * | 4/1974 | Tsuruishi | G04C 3/067 |
| | | | | 318/132 |
| 6,194,876 | B1 * | 2/2001 | Nagata | H02P 9/30 |
| | | | | 322/5 |
| 7,016,265 | B2 * | 3/2006 | Born | G04C 3/066 |
| | | | | 368/162 |
| 7,306,364 | B2 * | 12/2007 | Born | G04C 11/084 |
| | | | | 368/204 |
| 11,422,510 | B2 * | 8/2022 | Tombez | G04B 17/06 |
| 2005/0036405 | A1 * | 2/2005 | Born | G04B 17/063 |
| | | | | 368/127 |
| 2005/0128881 | A1 * | 6/2005 | Gueissaz | G04C 10/00 |
| | | | | 368/204 |
| 2013/0051191 | A1 * | 2/2013 | Schafroth | G04C 3/047 |
| | | | | 368/175 |
| 2018/0181073 | A1 * | 6/2018 | Tombez | G04C 3/04 |

* cited by examiner

TIMEPIECE COMPRISING A MECHANICAL OSCILLATOR ASSOCIATED WITH A REGULATION SYSTEM

CROSS-REFERENCE TO RELATED APPLICATION

This application claims priority to European Patent Application No. 17209130.8 filed on Dec. 20, 2017, the entire disclosure of which is hereby incorporated herein by reference.

TECHNICAL FIELD

The present invention relates to a timepiece comprising a mechanical oscillator associated with a system for regulating the medium frequency thereof. The regulation is of the electronic type, i.e. the regulation system comprises an electronic circuit connected to an auxiliary oscillator which is arranged to supply a high-precision electric clock signal. The regulation system is arranged to correct a potential time drift of the mechanical oscillator relative to the auxiliary oscillator.

In particular, the mechanical oscillator comprises a mechanical resonator formed by a balance-spring and a maintenance device formed by a conventional escapement, for example having Swiss pallets. The auxiliary oscillator is formed particularly by a quartz resonator or by a resonator integrated in the electronic regulation circuit.

TECHNOLOGICAL BACKGROUND

Movements forming timepieces as defined in the field of the invention have been proposed in some prior documents. The patent CH 597 636, published in 1977, proposes such a movement with reference to FIG. 3 thereof. The movement is equipped with a resonator formed by a balance-spring and a conventional maintenance device comprising pallets and an escapement wheel kinematically linked with a barrel equipped with a spring. This timepiece movement comprises a system for regulating the frequency of the mechanical oscillator. This regulation system comprises an electronic circuit and an electromagnetic assembly formed from a flat coil, arranged on a support arranged under the felloe of the balance, and from two magnets mounted on the balance and arranged close to one another so as to both pass over the coil when the oscillator is activated.

The electronic circuit comprises a time base comprising a quartz generator and serving to generate a reference frequency signal FR, this reference frequency being compared with the frequency FG of the mechanical oscillator. The frequency FG of the oscillator is detected via the electrical signals generated in the coil by the pair of magnets. The regulation circuit is suitable for momentarily inducing a braking torque via a magnetic magnet-coil coupling and a switchable load connected to the coil. The document CH 597 636 provides the following teaching: "The resonator formed should have a variable oscillation frequency according to the amplitude on either side of the frequency FR (isochronism error)". It is therefore taught that a variation in the oscillation frequency of a non-isochronous resonator is obtained by varying the oscillation amplitude thereof. An analogy is made between the oscillation amplitude of a resonator and the angular velocity of a generator comprising a rotor equipped with magnets and arranged in a geartrain of the timepiece movement in order to regulate the running thereof. As a braking torque reduces the rotational speed of such a generator and thus the rotational frequency thereof, it is herein merely envisaged to be able to reduce the oscillation frequency of an obligatorily non-isochronous resonator by applying a braking torque reducing the oscillation amplitude thereof.

To perform electronic regulation of the frequency of the generator, or of the mechanical oscillator, it is envisaged in a given embodiment that the load is formed by a switchable rectifier via a transistor which loads a storage capacitor during braking pulses, to retrieve the electrical energy so as to power the electronic circuit. The consistent teaching given in the document CH 597 636 is as follows: When FG>FR, the transistor is conductive; a power Pa is then drawn from the generator/oscillator When FG<FR, the transistor is non-conductive; therefore, power is no longer drawn from the generator/oscillator. In other words, regulation is merely performed when the frequency of the generator/of the oscillator is greater than the reference frequency FR. This regulation consists of braking the generator/oscillator with the aim of reducing the frequency FG thereof. Thus, in the case of the mechanical oscillator, those skilled in the art understand that regulation is only possible when the barrel spring is strongly armed and that the free oscillation frequency (natural frequency) of the mechanical oscillator is greater than the reference frequency FR, resulting from a voluntary isochronism error of the selected mechanical oscillator. Therefore, there is a two-fold problem, i.e. the mechanical oscillator is selected for that which is usually an error in a mechanical movement and the electronic regulation is only functional when the natural frequency of this oscillator is greater than a nominal frequency.

The patent application EP 1 521 142 also relates to the electronic regulation of a balance-spring. The regulation system proposed in this document is similar in the general functioning thereof to that of the patent CH 597 636.

The patent application EP 1 241 538 teaches that the braking moment of the mechanical oscillator, during an alternation (i.e. half-period or half-cycle) of any oscillation thereof, makes it possible either to reduce the value of the current oscillation period, or increase same. To do this, an electromagnetic magnet-coil assembly and a control circuit which is arranged to render the coils conductive or not during certain defined time intervals is provided. As a general rule, braking of the mechanical oscillator, by generating an electric power in the coils during magnet-coil coupling, during an oscillation period gives rise either to an increase in the corresponding period when this braking occurs prior to the passage of the mechanical resonator via the neutral point thereof (rest position), or to a decrease in the corresponding period when this braking occurs after the passage of the mechanical resonator via the neutral point thereof.

In relation to the implementation of an electronic regulation making use of the above-mentioned observation, the document EP 1 241 538 proposes two embodiments. In these two embodiments, a piezo-electric system is provided associated with the escapement to detect tipping of the pallets thereof in each oscillation period. By means of such a detection system, it is envisaged, on one hand, to compare the oscillation period with a reference period, defined by a quartz oscillator, to determine whether the running of the timepiece exhibits a gain or a loss and, on the other, to determine in one alternation out of every two the passage of the mechanical oscillator via the neutral point thereof. In the first embodiment, according to whether the time drift corresponds to a gain or a loss, it is envisaged to render the coils conductive for a certain time interval respectively before or after the passage via the neutral position of the mechanical oscillator in an alternation. In other words, it is envisaged herein to short-circuit the coils before or after the passage via the neutral position according to whether the regulation requires respectively an increase or a decrease of the oscillation period.

In the second embodiment, it is envisaged to power the regulation system by periodically drawing energy from the mechanical oscillator via the electromagnetic assembly. For this purpose, the coils are connected to a rectifier which is arranged to recharge a condenser (storage capacitor), which serves as a power supply source for the electronic circuit. The electromagnetic assembly is that given in FIGS. 2 and 4 of the document and the electronic circuit is represented schematically in FIG. 5 of this document. The only indications given for the functioning of the regulation system are as follows: 1) the coils are rendered conductive during constant time intervals which are centered on respective passages of the mechanical resonator (balance-spring) via the neutral position thereof (median alternation position); 2) during these time intervals, an induced current is rectified and stored in the condenser; and 3) during said time intervals, the oscillation period of the balance-spring may be regulated effectively by adjusting the power generated by the induced current, without any further details being provided.

It may be considered that the choice of coil conduction intervals centered on the neutral positions of the mechanical resonator has the objective of not inducing a parasitic time drift in the mechanical oscillator by drawing energy therefrom to power the electronic circuit. By rendering the coils conductive for the same duration before and after the passage via the neutral position, the author maybe thinks to poise the effect of a braking preceding such a passage via the neutral position with the effect of a braking following this passage to thus not modify the oscillation period in the absence of a regulation circuit correction signal arising from the measurement of a time drift. One may have strong doubts that this is achieved with the electromagnetic assembly disclosed and a conventional rectifier connected to a storage capacitor. Firstly, the recharging of this storage capacitor is dependent on the initial voltage thereof at the start of a given time interval. Subsequently, the induced voltage and the induced current in the coils vary in intensity with the angular velocity of the balance-spring, this intensity decreasing on moving away from a neutral position where the angular velocity is maximum. The electromagnetic assembly disclosed makes it possible to determine the shape of the induced voltage/induced current signal. Although the angular position of the magnets relative to the coils for the neutral position (rest position) is not given and it is not possible to infer a teaching on the signal phase, it may be inferred that the recharging of the storage capacitor will usually take place mostly prior to the passage via the neutral position. Thus, a braking results therefrom which is not symmetrical relative to the neutral position and a parasitic loss in the running of the timepiece. Finally, as regards the adjustment of the induced power during the time intervals envisaged to regulate the running of the timepiece, no indications are given. One does not understand how such an adjustment is made, no teaching being given on this matter.

SUMMARY OF THE INVENTION

A general aim, within the scope of the development resulting in the present invention, was that of producing a timepiece, comprising a mechanical movement with a mechanical oscillator and an electronic system for regulating this mechanical oscillator, for which it is not necessary to initially put the mechanical oscillator out of order to put it forward, in order to thus obtain a timepiece which has the precision of an auxiliary electronic oscillator (particularly equipped with a quartz resonator) when the regulation system is operational and, otherwise, the precision of the mechanical oscillator corresponding to the optimum setting thereof. In other words, it is sought to adjoin electronic regulation to a mechanical movement regulated as accurately as possible moreover such that it remains operational, with the best possible running, when the electronic regulation is inactive.

The first aim of the present invention is that of providing a timepiece of the type described above, but wherein the regulation system consumes relatively little electrical energy and thus enables effective self-powering of this regulation system by a lower electrical energy drawn from the mechanical oscillator of the timepiece, regardless of the magnitude of a time drift to be corrected in a range of values envisaged to be suitable for correction.

A further aim is that of providing a timepiece of the type described above, which is capable, for a defined electromagnetic assembly, of supplying an electrical power supply energy and continuously a power supply voltage which are sufficient to ensure the proper functioning of the regulation system, particularly in the absence of time drift correction.

One particular aim is that of providing such a timepiece which is capable, for a defined electromagnetic assembly, of supplying continuously an electrical power supply voltage which remains substantially maximum regardless of the time drift correction of this timepiece performed by the regulation system.

A further particular aim is that of ensuring self-powering of the regulation system without inducing a parasitic time drift, in particular in the absence of time drift correction, or at least such that any such parasitic time drift remains minimal and negligible.

To this end, the present invention relates to a timepiece, comprising:
   a mechanism,
   a mechanical resonator suitable for oscillating about a neutral position corresponding to the minimal mechanical potential energy state thereof, each oscillation of the mechanical resonator defining an oscillation period and having two successive alternations each between two extreme positions which define the oscillation amplitude of the mechanical resonator, each alternation having a passage of the mechanical resonator via the neutral position thereof at a median time and consisting of a first half-alternation between an initial time of this alternation and the median time thereof and a second half-alternation between this median time and an end time of this alternation,
   a maintenance device of the mechanical resonator forming with this mechanical resonator a mechanical oscillator which defines the running speed of said mechanism,
   an electromechanical transducer arranged to be able to convert mechanical power from the mechanical oscillator into electrical power, when the mechanical resonator oscillates with an amplitude included in an effective functioning range, this electromagnetic transducer being formed by an electromagnetic assembly comprising at least one coil, mounted on an element from the mechanical assembly consisting of the mechanical resonator and the support thereof, and at least one magnet, mounted on the other element of this mechanical assembly, the electromagnetic assembly being arranged so as to be able to supply an induced voltage signal between the two output terminals of the electromechanical transducer when the mechanical resonator oscillates with an amplitude included in said effective functioning range, an electric converter connected to the two output terminals of the electromechanical transducer so as to be able to receive an induced electric current from this electromechanical transducer, this electric converter comprising a power supply capacitor arranged to be able to store the electrical energy supplied by the electromechanical transducer, this electromechanical transducer and the electric converter forming a braking device of the mechanical resonator together which is arranged such that a quantity of electrical energy supplied to the power supply capacitor during recharging generally increases as the voltage level of this power supply capacitor lowers, a load connected or suitable for being regularly connected to the electric converter and powered by the power supply capacitor, a device for regulating the frequency of the mechanical oscillator, this regulating device comprising an auxiliary oscillator and a measuring device arranged to be able to detect a potential time drift of the mechanical oscillator relative to the auxiliary oscillator, the regulating device being arranged to be able to determine whether the time drift measured corresponds to at least one certain gain.

The timepiece according to the invention is characterized in that:

the braking device is arranged such that, in each oscillation period of the mechanical oscillator when the oscillation amplitude of the mechanical resonator is in said effective functioning range, the induced voltage signal exhibits a first voltage lobe occurring at least mostly in a first half-alternation or in each of the two first half-alternations and a second voltage lobe occurring at least mostly in a second half-alternation or in each of the two second half-alternations;

the braking device is arranged such that, at least when no time drift is detected by the measuring device and at least when said load consumes continuously or quasi-continuously electrical energy stored in the power supply capacitor during a normal functioning mode of the timepiece, each first voltage lobe and each second voltage lobe is suitable for generating an induced current pulse which recharges the power supply capacitor;

each first voltage lobe exhibits, in absolute values, a first maximum value at a first predetermined time of the corresponding first half-alternation and each second voltage lobe exhibits, in absolute values, a second maximum value at a second predetermined time of the corresponding second half-alternation, the first and second voltage lobes defining, on one hand, first time zones each situated before the first predetermined time of a different first voltage lobe preceding this first voltage lobe and, on the other, two time zones each situated before the second predetermined time of a different voltage lobe and after the first predetermined time of the first voltage lobe preceding this second voltage lobe;

the regulating device comprises a load pump device arranged to be able to extract on request an electric load from the power supply capacitor, so as to momentarily reduce the voltage level of this power supply capacitor; and the regulating device further comprises a logic control circuit which receives as an input a measurement signal supplied by the measuring device and which is arranged to activate the load pump device so that, when the time drift measured corresponds to said at least one certain gain, it extracts a first electric load from the power supply capacitor in a first time zone, the logic control circuit being further arranged to activate the load pump device so that it renders, in a normal functioning phase of the load pump device, at least partially the first electric load to the power supply capacitor in a second time zone.

The term 'voltage lobe' is understood to mean a voltage pulse which is situated entirely above or entirely below a null value (defining a zero voltage), i.e. a voltage variation within a certain time interval with either a positive voltage wherein the positive value rises then falls again, or a negative voltage wherein the negative value falls than rises again.

Extracting a first electric load in a first time zone as defined is envisaged to increase the recharging of the power supply capacitor upon the appearance of a first voltage lobe following this extraction, relative to the scenario where no extraction would take place. This increase in recharging means greater mechanical energy drawn from the mechanical oscillator by the braking system and therefore superior braking of this mechanical oscillator. As described hereinafter, braking in a first half-alternation before the passage of the mechanical resonator via the neutral position thereof induces a negative time-lag in the oscillation of the resonator, and thus the duration of the alternation in question is increased. Therefore, the instantaneous frequency of the mechanical oscillator is momentarily reduced and this results in a certain loss in the running of the mechanism which corrects at least partially the gain detected by the measuring device. Furthermore, at least partial rendering of the first electric load to the power supply capacitor in a second time zone as defined makes it possible to reduce the recharging of the power supply capacitor upon the appearance of a second voltage lobe following this rendering, relative to the scenario where no rendering would take place. This reduction in recharging means lower mechanical energy drawn from the mechanical oscillator by the braking system and therefore inferior braking of this mechanical oscillator. As described hereinafter, braking in a second half-alternation after the passage of the mechanical resonator via the neutral position thereof induces a positive time-lag in the oscillation of the resonator, and thus the duration of the alternation in question is reduced. As the braking herein is reduced relative to normal braking, the instantaneous frequency of the mechanical oscillator is also momentarily reduced and this likewise results in a certain loss in the running of the mechanism which also corrects at least partially the gain detected by the measuring device.

In a preferred embodiment, the timepiece is further characterized in that the regulating device is also arranged to be able to determine whether the time drift measured corresponds to at least one certain loss; and in that the logic control circuit is arranged to be able to activate the load pump device so that, when the time drift measured corresponds to said at least one certain loss, it extracts a second electric load from the power supply capacitor in a second time zone, the logic control circuit being further arranged to be able to activate the load pump device so that it renders, in a normal functioning phase of the regulating device, at least partially this second electric load to the power supply capacitor in a first time zone.

Extracting a second electric load in a second time zone as defined is envisaged to increase the recharging of the power supply capacitor upon the appearance of a second voltage lobe following this extraction, relative to the scenario where no extraction would take place. As shall be understood hereinafter, this induces a positive time-lag in the oscillation of the resonator, and thus the duration of the alternation in question is reduced. Therefore, the instantaneous frequency of the mechanical oscillator is momentarily increased and this results in a certain gain in the running of the mechanism which corrects at least partially the loss detected by the measuring device. Furthermore, at least partial rendering of the second electric load to the power supply capacitor in a first time zone as defined makes it possible to reduce the recharging of the power supply capacitor upon the appearance of a first voltage lobe following this rendering, relative to the scenario where no rendering would take place. This reduction in recharging means lower mechanical energy drawn from the mechanical oscillator by the braking system and therefore inferior braking of this mechanical oscillator. This also induces a positive time-lag in the oscillation of the resonator, and thus the duration of the alternation in question is also reduced. Therefore, the instantaneous frequency of the mechanical oscillator is momentarily increased and this results in a certain gain in the running of the mechanical which also corrects at least partially the loss detected by the measuring device.

In one particular embodiment, the logic control circuit is arranged so as to be able to perform, when the time drift measured corresponds to said at least one certain gain or to at least one gain greater than the latter, a plurality of extractions of first electric loads during a plurality of respective first time zones. In one alternative embodiment of the preferred embodiment mentioned above, the logic control circuit is arranged so as to be able to perform, when the time drift measured corresponds to said at least one certain loss or to at least one loss greater than the latter, a plurality of extractions of second electric loads during a plurality of respective second time zones.

In a general alternative embodiment, the load connected or suitable for being regularly connected to the output of the electric converter is formed particularly by the regulation circuit. This makes it possible to obtain a regulation system self-powered by mechanical energy drawn from the mechanical oscillator. In a preferred embodiment, the electromagnetic assembly is arranged such that, in the absence of activation of the load pump device to correct a certain time drift, a certain time-lag introduced by braking of the mechanical oscillator upon the appearance of a first voltage lobe is substantially compensated by a further time-lag of opposite mathematical sign generated by braking upon the appearance of second subsequent voltage lobe.

A remarkable advantage of the timepiece according to the invention lies in that regulation is obtained upon a time drift detected in the running of the mechanism in question by drawing a minimum energy from the oscillator in addition to the electrical energy required to power the electronic circuit forming the regulating device.

BRIEF DESCRIPTION OF THE FIGURES

The invention will be described in more detail hereinafter using the appended drawings, given by way of examples that are in no way limiting, wherein.

DETAILED DESCRIPTION OF THE INVENTION

Figure 1:
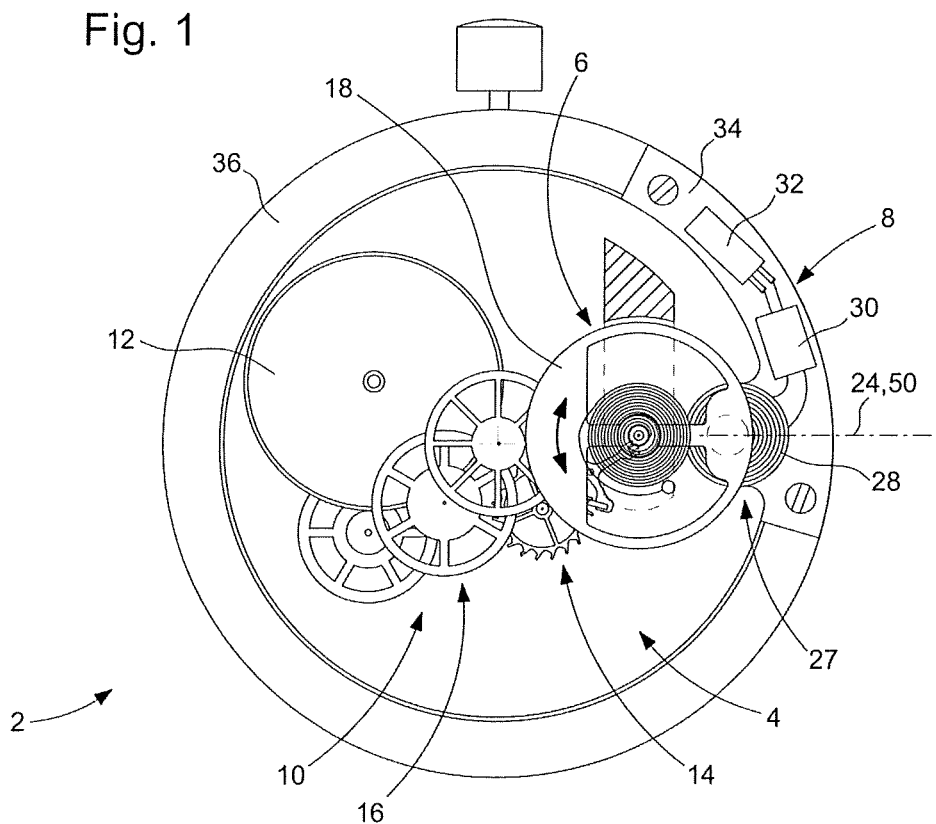
FIG. 1 is a general top view of a first embodiment of a timepiece according to the invention.
Figure 2:
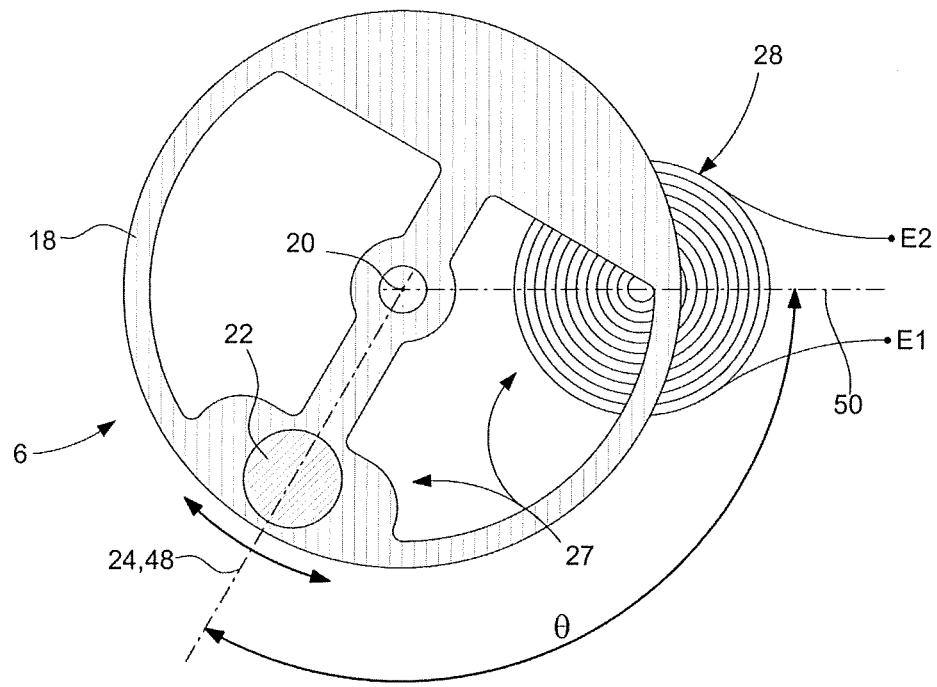
FIG. 2 is an enlarged partial view of the timepiece in FIG. 1, showing the electromagnetic assembly forming an electromagnetic transducer of a regulation system incorporated in this timepiece.

With reference to FIGS. 1 and 2, a timepiece according to the present invention will be described hereinafter. FIG. 1 is a partial plane view of a timepiece 2 comprising a mechanical movement 4, equipped with a mechanical resonator 6, and a regulation system 8. The maintenance means 10 of the mechanical resonator are conventional. They comprise a barrel 12 with a driving spring, an escapement 14 formed from an escapement wheel and a pallet assembly, as well as an intermediate geartrain 16 kinematically linking the barrel to the escapement wheel. The resonator 6 comprises a balance 18 and a standard balance-spring, the balance being pivotally mounted about an axis of rotation 20 between a plate and a bar. The mechanical resonator 6 and the maintenance means 10 (also referred to as excitation means) form a mechanical oscillator together. It shall be noted that, in general, in the definition of a mechanical timepiece oscillator, only the escapement is retained as maintenance means/excitation means of this mechanical oscillator, the energy source and an intermediate geartrain being considered separately. The balance-spring oscillates about the axis 20 when it receives mechanical pulses from the escapement wherein the escapement wheel is driven by the barrel. The geartrain 16 is part of a mechanism of the timepiece movement, the running speed whereof is set by the mechanical oscillator. This mechanism comprises, besides the geartrain 16, further wheels and analogue indicators (not shown) kinematically linked to this geartrain 16, the movement speed of these analogue indicators being set by the mechanical oscillator. Various mechanisms known to those skilled in the art may be envisaged.

FIG. 2 is a partial view of FIG. 1, along a horizontal cross-section at the level of the balance 18, showing a magnet 22 and a coil 28 forming an electromagnetic assembly 27 according to the invention. The coil 28 is preferably of the wafer type (disc shape having a relatively small thickness). It is arranged on the plate of the timepiece movement and conventionally comprises two connection ends E1 and E2. As a general rule, the electromagnetic assembly comprises at least one coil and a magnetized structure formed from at least one magnet generating a magnetic flux, in the direction of a general plane of the coil, which passes therethrough when the mechanical resonator oscillates with an amplitude included in an effective functioning range. In the example shown, the balance 18 bears, preferably in a zone situated in the vicinity of the outer diameter thereof defined by the felloe thereof, the bipolar magnet 22 which has an axially oriented magnetization axis. It shall be noted that it is preferable to confine the magnetic flux of the magnet or magnets borne by the balance using a casing formed by parts of the balance, in particular by magnetic parts arranged on both sides of the magnet(s) along the axial direction such that the coil is partially situated between these two magnetic parts.

The balance 18 defines a half-axis 24, from the axis of rotation 20 thereof and perpendicularly thereto, which passes in the center of the magnet 22. When the balance-spring is in the rest position thereof, the half-axis 24 defines a neutral position (angular rest position of the balance-spring corresponding to a zero angle) about which the balance-spring may oscillate at a certain frequency, particularly at a free frequency F0 corresponding to the natural oscillation frequency of the mechanical oscillator not subject to external force torques (other than those supplied periodically via the escapement). In FIG. 2, the mechanical resonator 6 (represented in the balance-spring thereof which is situated above the cutting plane) is represented in the neutral position thereof, corresponding to the minimum potential mechanical energy state thereof. It is noted that, in the neutral position, the half-axis 24 defines a reference half-axis 48 which is out of step by an angle θ relative to the fixed half-axis 50 perpendicularly intercepting the axis of rotation 20 and the central axis of the coil 28. In other words, in projection in the general plane of the balance, the center of the coil 28 has an angular lag θ relative to the reference half-axis 48. In FIG. 2, this angular lag equals 120° in absolute values. Preferably, this angular lag θ is between 30° and 120° in absolute values.

Each oscillation of the mechanical resonator defines an oscillation period and it has a first alternation followed by a second alternation each between two extreme positions defining the oscillation amplitude of the mechanical resonator (note that the oscillating resonator and therefore the mechanical oscillator as a whole are considered herein, the oscillation amplitude of the balance-spring being defined inter alia by the maintenance means). Each alternation exhibits a passage of the mechanical resonator via the neutral position thereof at a median time and a certain duration between a start time and an end time which are defined respectively by the two extreme positions occupied by the mechanical resonator respectively at the start and at the end of this alternation. Each alternation thus consists of a first half-alternation ending at said median time and a second half-alternation starting at this median time.

The system 8 for regulating the frequency of the mechanical oscillator comprises an electronic circuit 30 and an auxiliary oscillator 32, this auxiliary oscillator comprising a clock circuit and for example a quartz resonator connected to this clock circuit. It shall be noted that, in one alternative embodiment, the auxiliary oscillator is integrated at least partially in the electronic circuit. The regulation system further comprises the electromagnetic assembly 27 described above, namely the coil 28 which is electrically connected to the electronic circuit 30 and the bipolar magnet 22 mounted on the balance. Advantageously, the various elements of the regulation system 8, with the exception of the magnet, are arranged on a support 34 with which they form a mechanically independent module of the timepiece movement. Thus, this module may be assembled or associated with the mechanical movement 4 during the mounting thereof in a case. In particular, as represented in FIG. 1, the above-mentioned module is attached to a casing ring 36 surrounding the timepiece movement. It is understood that the regulation module may therefore be associated with the timepiece movement once the latter is entirely assembled and adjusted, the assembly and disassembly of this module being possible without having to work on the mechanical movement per se.

With reference to FIGS. 3 to 6C, the physical phenomenon whereon the regulation principle implemented in the timepiece according to the invention is based will firstly be described. A timepiece similar to that in FIG. 1 is considered herein. The mechanical resonator 40, of which only the balance 42 has been represented in FIGS. 4A-4C and 6A-6C, bears a single bipolar magnet 44 the magnetization axis whereof is substantially parallel with the axis of rotation 20 of the balance, i.e. with an axial orientation. In this case, the half-axis in question 46 of the mechanical resonator 40 passes through the center of rotation 20 and the center of the magnet 44. In the example described, the angle θ between the reference half-axis 48 and the half-axis 50 has a value of approximately 90°. The two half-axes 48 and 50 are fixed relative to the timepiece movement, whereas the half-axis 46 oscillates with the balance and gives the angular position β of the magnet mounted on this balance relative to the reference half-axis, the latter defining the zero angular position for the mechanical resonator. More generally, the angular lag θ is such that an induced voltage signal generated in the coil on the passage of the magnet facing this coil is situated, upon a first alternation of any oscillation, prior to the passage of the median half-axis by the reference half-axis (therefore in a first half-alternation) and, during a second alternation of any oscillation, after the passage of this median half-axis via the reference half-axis (therefore in a second half-alternation).

Figure 3:
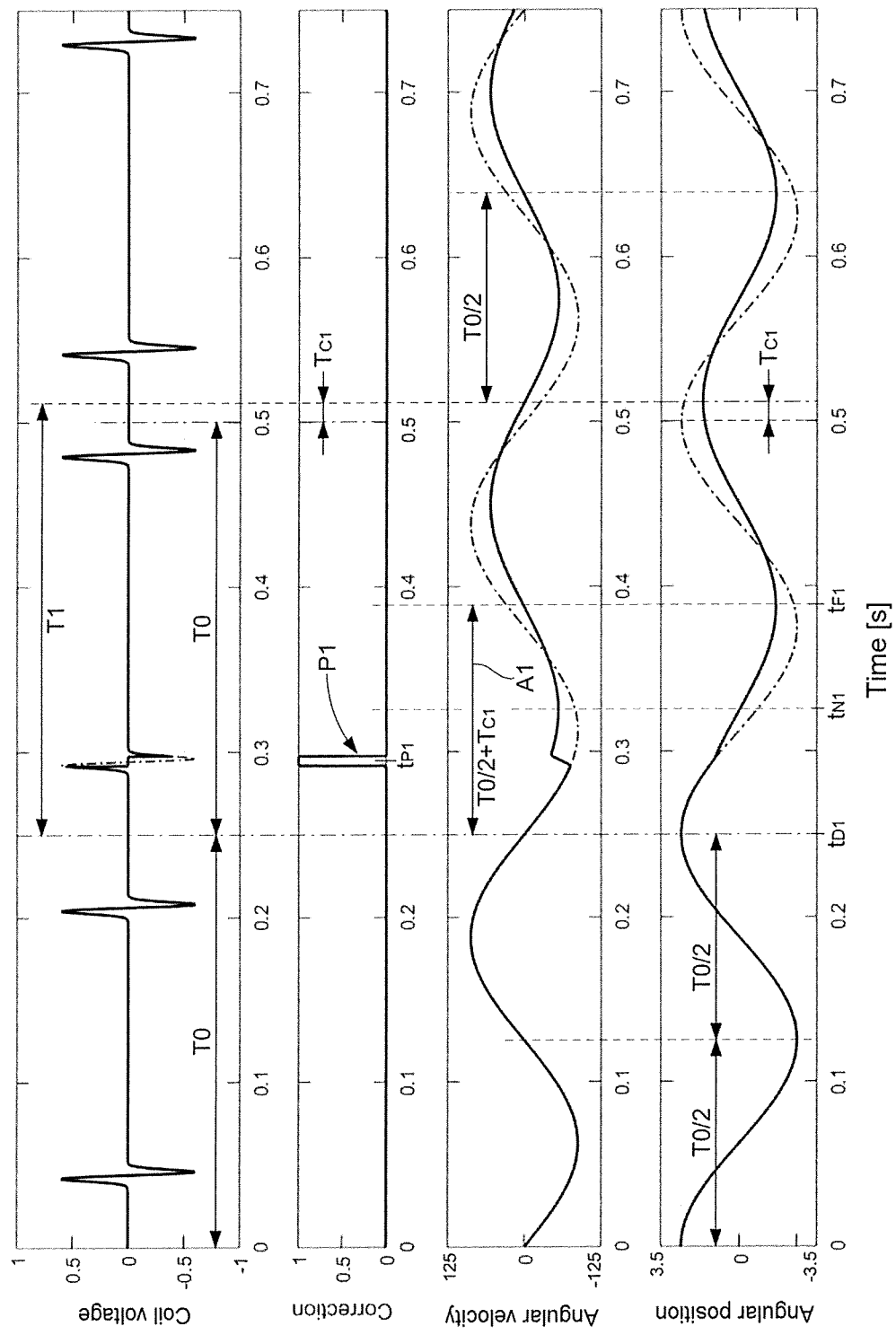
FIG. 3 represents, for an electromagnetic assembly given in FIGS. 4A to 4C which corresponds to the first embodiment, the induced voltage in the coil of this electromagnetic assembly when the balance-spring oscillates and the application of a first braking pulse in a certain alternation before the balance-spring passes via the neutral position thereof, as well as the angular velocity of the balance and the angular position thereof in a time interval wherein the first braking pulse occurs.

FIG. 3 shows four graphs. The first graph gives the voltage in the coil 28 over time when the resonator 40 oscillates, i.e. when the mechanical oscillator is activated.

The second graph shows the time $t_{P1}$ at which a braking pulse is applied to the resonator 40 to make a correction in the running of the mechanism set by the mechanical oscillator. The time of the application of a rectangular-shaped pulse (i.e. a binary signal) is considered herein as the time position of the middle of this pulse. A variation in the oscillation period is observed during which the braking pulse and therefore an isolated variation of the frequency of the mechanical oscillator occur. In fact, as can be seen in the final two graphs of FIG. 3, respectively showing the angular velocity (values in radian per second: [rad/s]) and the angular position (values in radian: [rad]) of the balance over time, the time variation relates to the sole alternation during which the braking pulse occurs. It shall be noted that each oscillation has two successive alternations which are defined in the present text as the two half-periods during which the balance respectively sustains an oscillation movement in one direction and subsequently an oscillation movement in the other direction. In other words, as previously explained, an alternation corresponds to a swing of the balance in one direction or the other between the two extreme positions thereof defining the oscillation amplitude.

The term braking pulse denotes an application, substantially during a limited time interval, of a certain force couple to the mechanical resonator braking same, i.e. a force torque opposing the oscillation movement of this mechanical resonator. As a general rule, the braking torque may be of various types, particularly magnetic, electrostatic or mechanical. In the embodiment described, the braking torque is obtained by the magnet-coil coupling and therefore it corresponds to a magnetic braking torque applied on the magnet 44 via the coil 28 which is controlled by a regulating device. Such braking pulses may for example be generated by short-circuiting the coil momentarily. This action can be detected in the graph of the coil voltage in the time zone during which the braking pulse is applied, this time zone being envisaged upon the appearance of an induced voltage pulse in the coil by the passage of the magnet. It is obviously in this time zone that the magnet-coil coupling enables contactless action via a magnetic torque on the magnet attached to the balance. Indeed, it is observed that the coil voltage falls towards zero during a short-circuit braking pulse (the induced voltage in the coil 28 by the magnet 44 being shown with lines in the above-mentioned time zone). Note that the short-circuit braking pulses represented in FIGS. 3 and 5 are mentioned herein within the scope of the explanations given, as the present invention envisages recovery of the braking energy to power the regulating device in particular.

Figure 5:
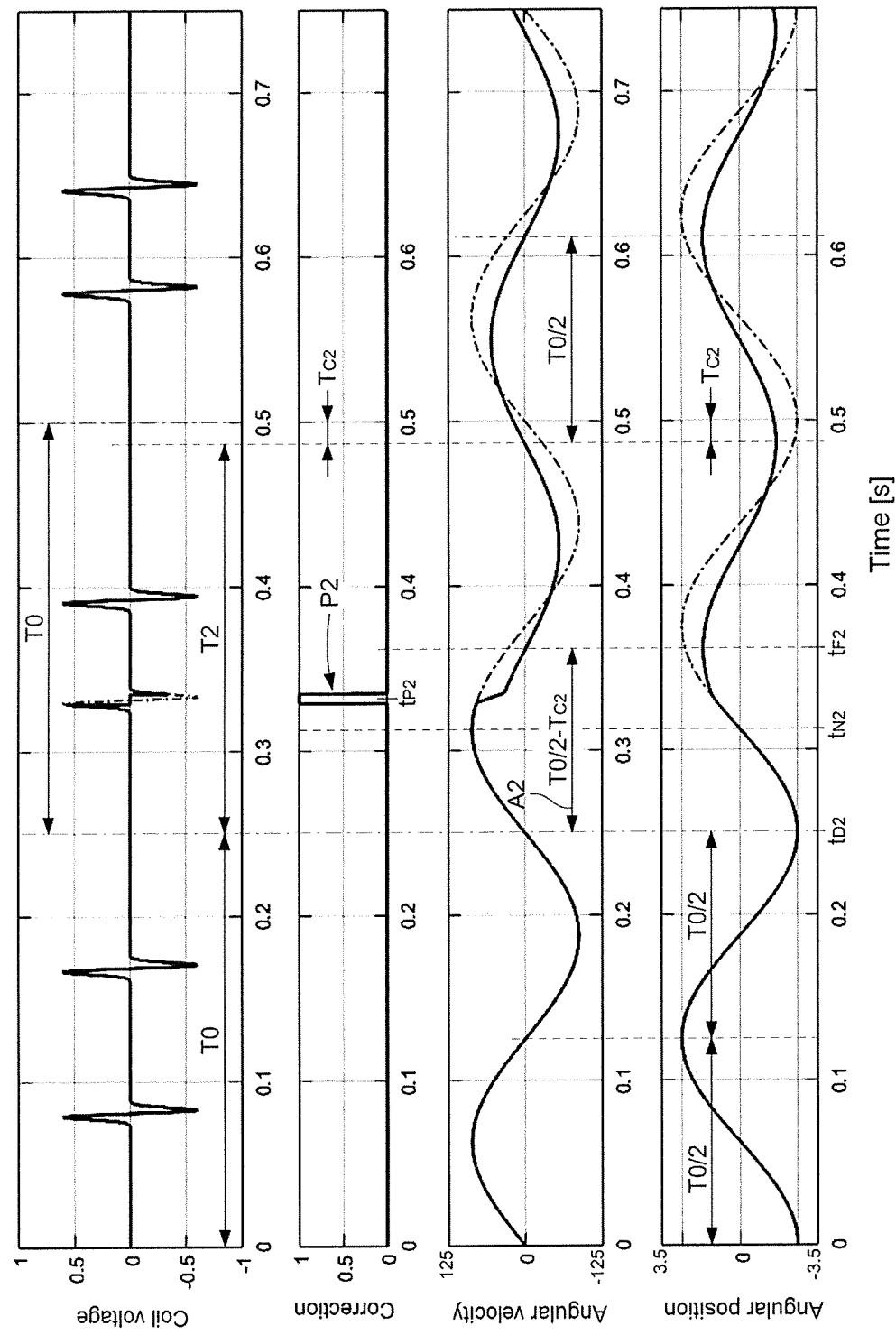
FIG. 5 is a figure similar to that in FIG. 3 with the application of a second braking pulse in a certain alternation after the balance-spring has passed via the neutral position thereof.

In FIGS. 3 and 5, the oscillation period T0 corresponds to a 'free' oscillation (i.e. without applying regulation pulses) of the mechanical oscillator. Each of the two alternations of an oscillation period has a duration T0/2 without external disturbance or constraint (particularly by a regulation pulse). The time t=0 marks the start of a first alternation. It shall be noted that the 'free' frequency F0 of the mechanical oscillator is herein approximately equal to four Hertz (F0=4 Hz), such that the period T0=250 ms approximately.

Figure 4A:
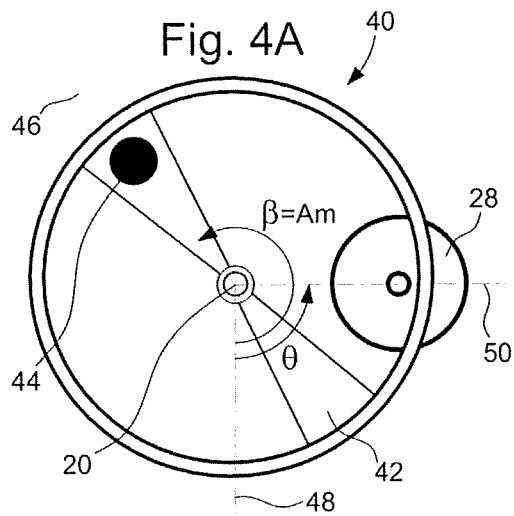
FIGS. 4A to 4C show, for the electromagnetic transducer in question in FIG. 3, the balance at three specific times of an alternation of the mechanical oscillator during which the first braking pulse is supplied.
Figure 4B:
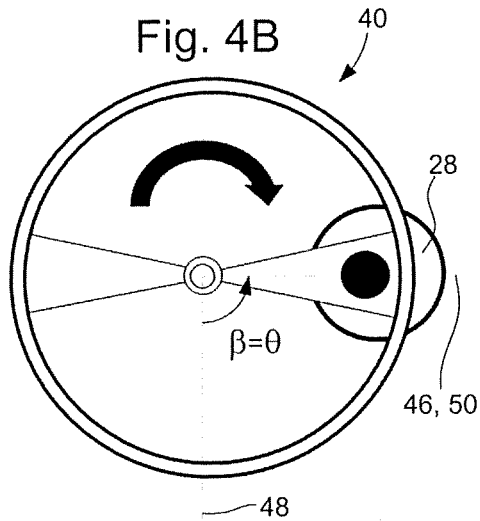
Figure 4C:
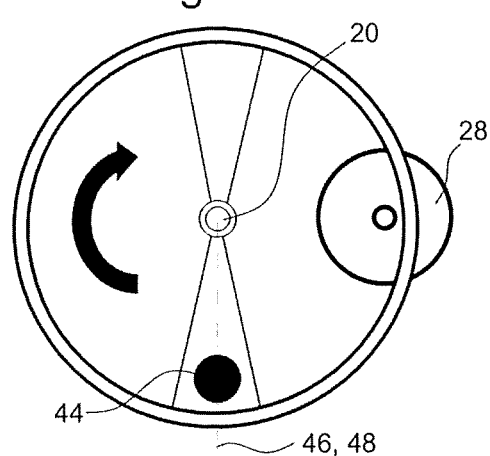

With reference to FIGS. 3 and 4A-4C, the behavior of the mechanical oscillator in a first scenario shall be described. After a first period T0 commences a new period T1, respectively a new alternation A1 during which a braking pulse P1 occurs. At the initial time $t_{D1}$ starts the alternation A1, the resonator 40 then being in the state in FIG. 4A where the magnet 44 occupies an angular position β corresponding to an extreme position (maximum positive angular position $A_m$). Then the braking pulse P1 occurs at the time $t_{P1}$ which is situated before the median time $t_{N1}$ at which the resonator passes via the neutral position thereof, FIGS. 4B, 4C representing the resonator at the two successive times $t_{P1}$ and $t_{N1}$ respectively. Finally, the alternation A1 ends at the end time $t_{F1}$.

In this first case, the braking pulse is generated between the start of an alternation and the passage of the resonator via the neutral position thereof, i.e. in a first half-alternation of this alternation. As envisaged, the angular velocity in absolute values decreases during the braking pulse P1. This induces a negative time-lag $T_{C1}$ in the oscillation the resonator, as shown by the two graphs of the angular velocity and of the angular position in FIG. 3, i.e. a loss relative to the non-disturbed theoretical signal (shown with broken lines). Thus, the duration of the alternation A1 is increased by a time interval $T_{C1}$. The oscillation period T1, comprising the alternation A1, is therefore extended relative to the value T0. This induces an isolated decrease in the frequency of the mechanical oscillator and a momentary slowing-down of the running of the associated mechanism.

Figure 6A:
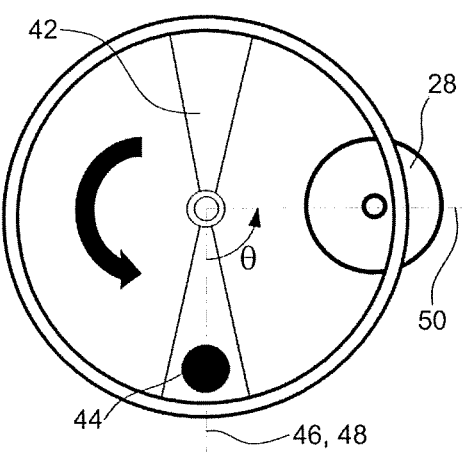
FIGS. 6A to 6C show the balance at three specific times of an alternation of the mechanical oscillator during which the second braking pulse is supplied.
Figure 6B:
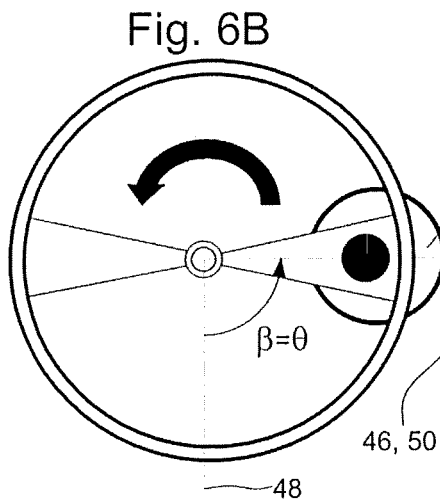
Figure 6C:
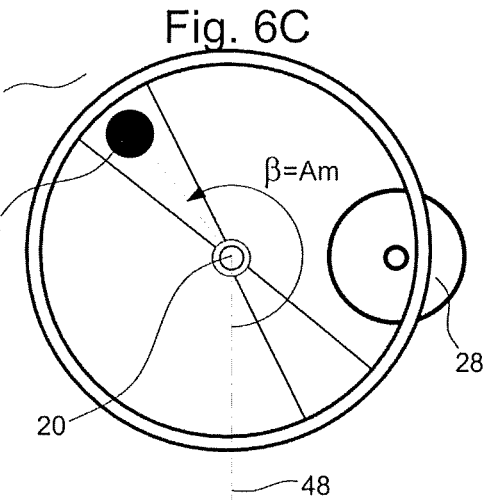

With reference to FIGS. 5 and 6A-6C, the performance of the mechanical oscillator in a second scenario shall be described. The graphs in FIG. 5 show the progression over time of the same variables as in FIG. 3. After a first period T0 commences a new period T2, respectively an alternation A2 during which a braking pulse P2 occurs. At the initial time $t_{D2}$ starts the alternation A2, the resonator 40 then being in an extreme position (maximum negative angular position not shown). After a quarter-period (T0/4) corresponding to a half-alternation, the resonator reaches the neutral position thereof at the median time $t_{N2}$ (configuration shown in FIG. 6A). Then the braking pulse P2 occurs at the time $t_{P2}$ which is situated after the median time $t_{N2}$ at which the resonator passes via the neutral position thereof in the alternation A2, i.e. in a second half-alternation of this alternation. Finally, this alternation ends at the end time $t_{F2}$ at which the resonator once again occupies an extreme position (maximum positive angular position). FIGS. 6B and 6C represent the resonator at the two successive times $t_{N2}$ and $t_{F2}$ respectively. It shall be noted in particular that the configuration in FIG. 6A is distinguished from the configuration in FIG. 4C by the reverse directions of the respective oscillation movements. Indeed, in FIG. 4C, the balance rotates in the clockwise direction when it passes via the neutral position in the alternation A1, whereas in FIG. 6A this balance rotates in the anti-clockwise direction upon passing via the neutral position in the alternation A2.

In the second scenario considered, the braking pulse is thus generated, in an alternation, between the median time at which the resonator passes via the neutral position thereof and the end time at which this alternation ends. As envisaged, the angular velocity in absolute values decreases during the braking pulse P2. Remarkably, the braking pulse induces herein a positive time-lag $T_{C2}$ in the oscillation period of the resonator, as shown by the two graphs of the angular velocity and of the angular position in FIG. 5, i.e. a gain relative to the non-disturbed theoretical signal (shown with broken lines). Thus, the duration of the alternation A2 is decreased by a time interval $T_{C2}$. The oscillation period T2, comprising the alternation A2, is therefore shorter than the value T0. Consequently, this induces an 'isolated' decrease in the frequency of the mechanical oscillator and a momentary acceleration of the running of the associated mechanism.

Figure 7:
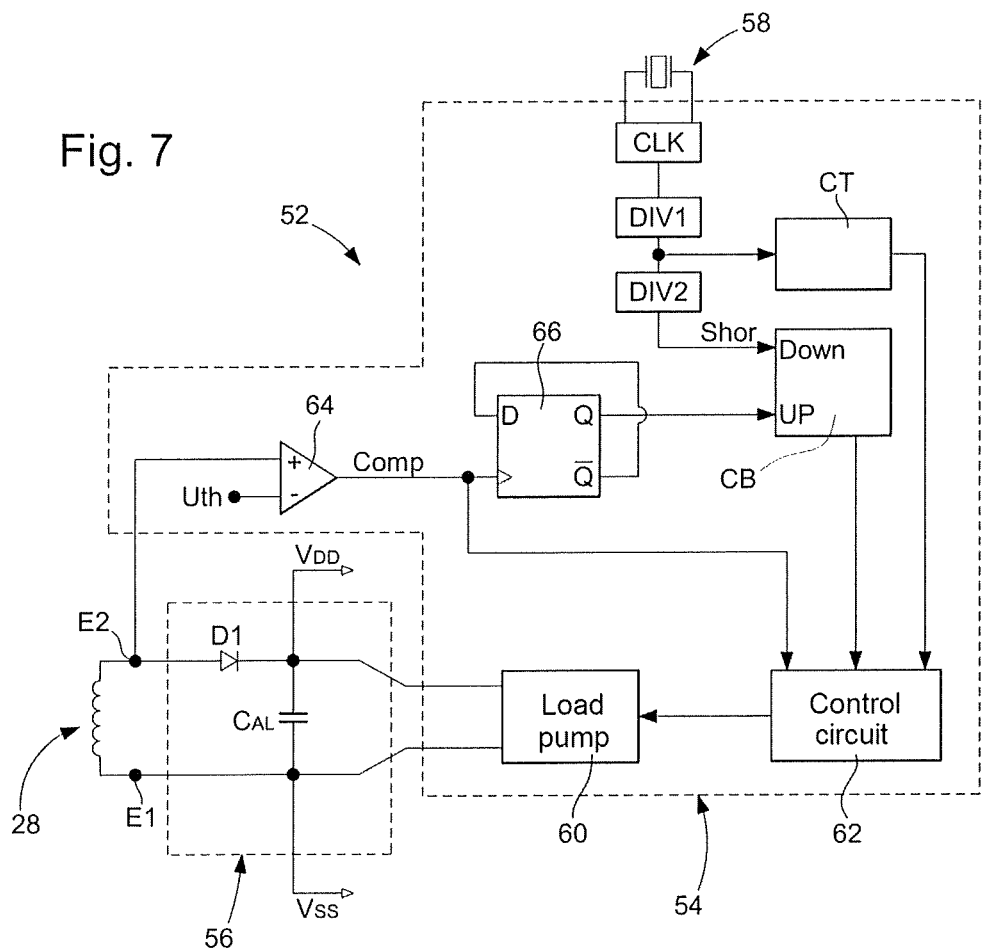
FIG. 7 shows the electrical diagram of an electric converter and a regulating device of the mechanical oscillator envisaged in the first embodiment of the timepiece.

With reference to FIGS. 1 and 2 described above and to FIGS. 7 to 10C, a first embodiment of a timepiece according to the invention shall be described hereinafter. This timepiece 2 comprises:

a mechanism 12, 16 (shown partially), a mechanical resonator 6 (balance-spring) suitable for oscillating about a neutral position 48 corresponding to the minimal mechanical potential energy state thereof, each alternation of the successive oscillations having a passage of the mechanical resonator via the neutral position thereof at a median time and consisting of a first half-alternation ending at the median time thereof and of a second half-alternation starting at the median time thereof, a maintenance device 14 of the mechanical resonator forming with this mechanical resonator a mechanical oscillator which sets the running speed of the mechanism, an electromechanical transducer arranged to be able to convert mechanical power from the mechanical oscillator into electrical power, when the mechanical oscillator 6 oscillates with an amplitude included in an effective functioning range, this electromagnetic transducer being formed by an electromagnetic assembly 27 comprising a coil 28 (only element of the electromagnetic assembly represented schematically in FIG. 7), mounted on the support (in particular the plate of the movement 4) of the mechanical resonator, and a magnet 22 mounted on this mechanical resonator, the electromagnetic assembly 27 being arranged so as to be able to supply an induced voltage signal $U_i(t)$ (FIG. 10A) between the two output terminals E1 and E2 of the electromechanical transducer when the mechanical resonator oscillates with an amplitude included in the effective functioning range, an electric converter 56 connected to the two output terminals of the electromechanical transducer so as to be able to receive an induced electric current $I_{Rec}$ (FIG. 10B) from this electromechanical transducer, this electric converter comprising a power supply capacitor $C_{AL}$ arranged to be able to store the electrical energy supplied by the electromechanical transducer, this electromechanical transducer and the electric converter forming a braking device of the mechanical resonator together, a device 52 for regulating the frequency of the mechanical oscillator, this regulating device comprising an auxiliary oscillator 58 & CLK and a measuring device arranged to be able to measure a potential time drift of the mechanical oscillator relative to the auxiliary oscillator, the regulating device being arranged to be able to determine whether the time drift measured corresponds to at least one certain gain or to at least one certain loss.

Preferably, the electromagnetic assembly 27 also partly forms the measuring device. This measuring device further comprises a bidirectional counter CB and a comparator 64 (of the Schmidt trigger type). The comparator receives at one input the induced voltage signal $U_i(t)$ and at the other input a threshold voltage signal $U_{th}$ the value whereof is positive in the example given. As the induced voltage signal $U_i(t)$ has in each oscillation period of the resonator 6 two positive lobes (FIG. 10A) exceeding the value $U_{th}$, the comparator supplies as an output a signal 'Comp' having two pulses S1 and S2 (FIG. 10C) per oscillation period. This signal 'Comp' is supplied, on one hand, to a logic control circuit 62 and, on the other, to a control 66 which inhibits one pulse out of every two so as to supply a single pulse per oscillation period to a first input 'UP' of the bidirectional counter CB. The bidirectional counter comprises a second input 'Down' which receives a clock signal $S_{hor}$ at a nominal frequency/set-point frequency for the oscillation frequency, this clock signal being derived from the auxiliary oscillator which supplies a digital reference signal defining a reference frequency. The auxiliary oscillator comprises a clock circuit CLK serving to excite the quartz resonator 58 and supply in return the reference signal which is composed of a succession of pulses corresponding respectively to the oscillation periods of the quartz resonator.

The clock signal supplies the reference signal thereof to a divider DIV1 & DIV2 which divides the number of pulses in this reference signal by the ratio between the nominal period of the mechanical oscillator and the nominal reference period of the auxiliary oscillator. The divider thus supplies a clock signal $S_{hor}$ defining a set-point frequency (for example 4 Hz) and presenting one pulse per set-point period (for example 250 ms) to the counter CB. Thus, the state of the counter CB determines the gain (if the number is positive) or the loss (if the number is negative) accumulated over time by the mechanical oscillator relative to the auxiliary oscillator with a resolution corresponding substantially to a set-point period. The state of the counter is supplied to a logic control circuit 62 which is arranged to determine whether this state corresponds to at least one certain gain (CB>N1, where N1 is a natural number) or to at least one certain loss (CB<−N2, where N2 is a natural number).

The electric converter 56 comprises a circuit for storing electrical energy D1 & $C_{AL}$ which is arranged, in the alternative embodiment described, to be able to recharge the power supply capacitor $C_{AL}$ merely with a positive input voltage of the electric converter, i.e. merely with a positive induced voltage supplied by the coil 28. When recharging the power supply capacitor, the quantity of electrical energy supplied by the braking device to this power supply capacitor increases as the voltage level of this power supply capacitor lowers. A load is connected or suitable for being regularly connected to the electric converter 56 and powered by the power supply capacitor which supplies the power supply voltage $U_{AL}(t)$ between the two power supply terminals $V_{DD}$ and $V_{SS}$, this load particularly comprising the regulation circuit 54.

Figure 8:
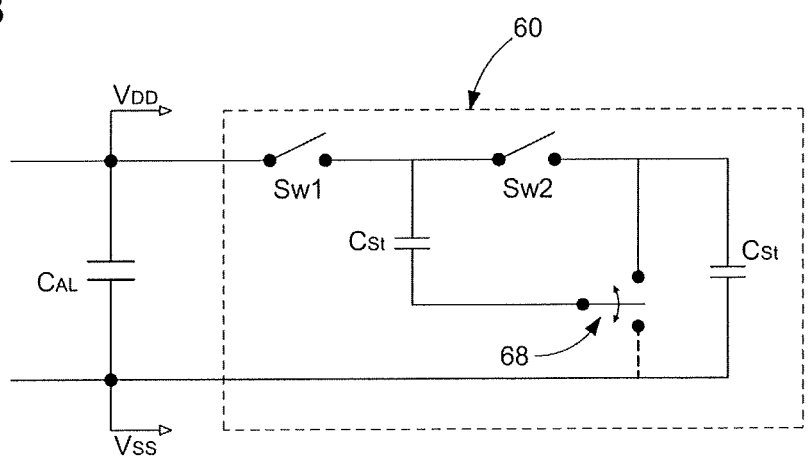
FIG. 8 shows the electronic circuit of a load pump forming the regulating device represented in FIG. 7.

The timepiece 2 is remarkable in that the regulation circuit 54 of the regulating device comprises a load pump 60 arranged to be able to transfer on request a certain electric load from the power supply capacitor $C_{AL}$ to the switchable capacitors $C_{St}$ of the load pump, and vice versa. An alternative embodiment of such a load pump is represented in FIG. 8. This load pump comprises an input switch Sw1 and a circuit for storing a certain electric load comprising a switch Sw2, a switch 68 and two temporary storage capacitors $C_{St}$. To transfer an electric load from the power supply capacitor to the capacitors $C_{St}$, the latter are connected in parallel. Then, to render substantially this electric load to the power supply capacitor, the two capacitors $C_{St}$ are connected in series. The switches Sw1, Sw2 and the switch 68 are controlled by the logic control circuit 62 according to a regulation method (FIG. 9) implemented in the first embodiment of the timepiece according to the invention which shall be described hereinafter.

Figure 10A:
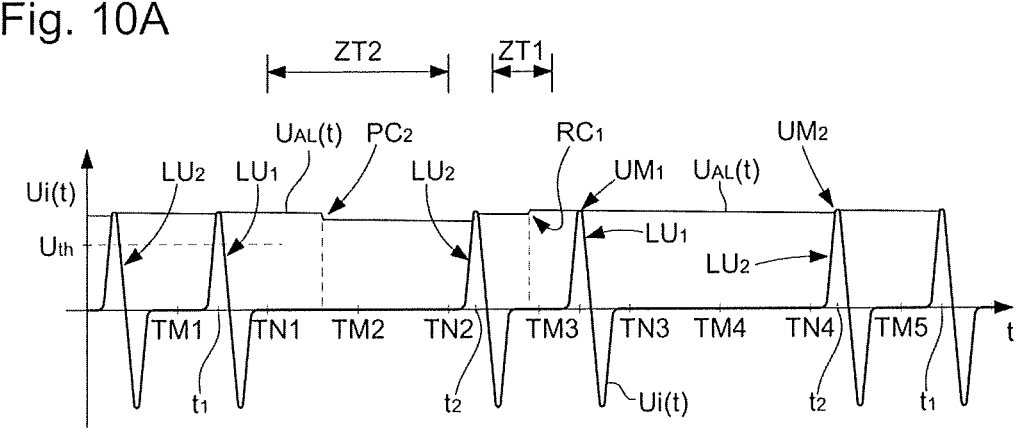
FIGS. 10A to 10C represent various electrical signals arising in the electrical diagram in FIG. 7.
Figure 10B:
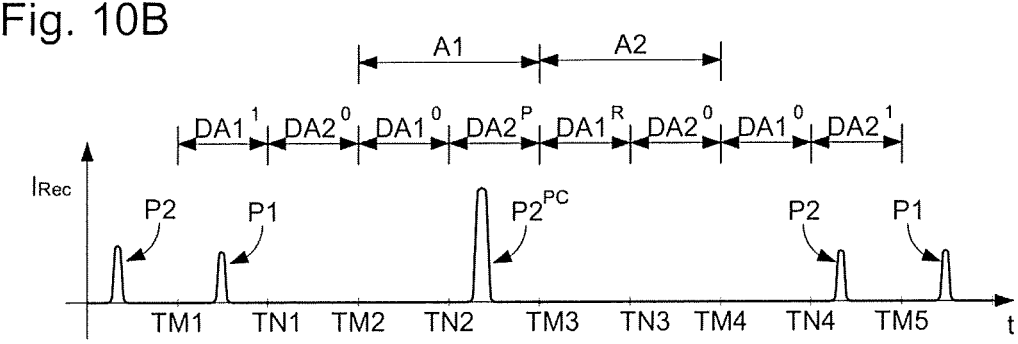

In FIGS. 10A and 10B, the induced voltage signal Ui(t) corresponds to that generated by the electromagnetic assembly 27 associated with the mechanical resonator 6 when the latter oscillates in an effective functioning range. On the time axis [t] are indicated the median times TNn, n=0, 1, 2, . . . , corresponding to the successive passages of the mechanical resonator via the neutral position thereof, as well as the times TMn, n=0, 1, 2, . . . , corresponding to the successive passages of the mechanical resonator alternately via the two extreme positions thereof where the angular velocity thereof is zero and the direction of the swing thereof is inverted. According to the invention, the braking device 27 & 56 is arranged such that, in each oscillation period of the mechanical resonator 6 at least when the oscillation amplitude of this mechanical resonator is in the effective functioning range, the induced voltage signal Ui(t) exhibits a first voltage lobe $LU_1$ occurring in a first half-alternation $DA1^1$, $DA1^R$ and a second voltage lobe $LU_2$ occurring in a second half-alternation $DA2^1$, $DA2^P$. The induced voltage signal thus exhibits alternately a succession of first voltage lobes $LU_1$ and second voltage lobes $LU_2$. Each first voltage lobe $LU_1$ exhibits a first maximum value $UM_1$ at a first time $t_1$ of the corresponding first half-alternation and each second voltage lobe $LU_2$ exhibits a second maximum value $UM_2$ at a second time $t_2$ of the corresponding second half-alternation.

Figure 10C:
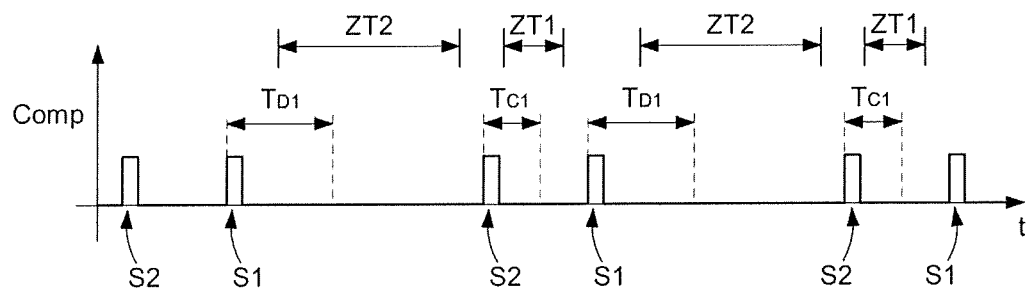
Figure 11:
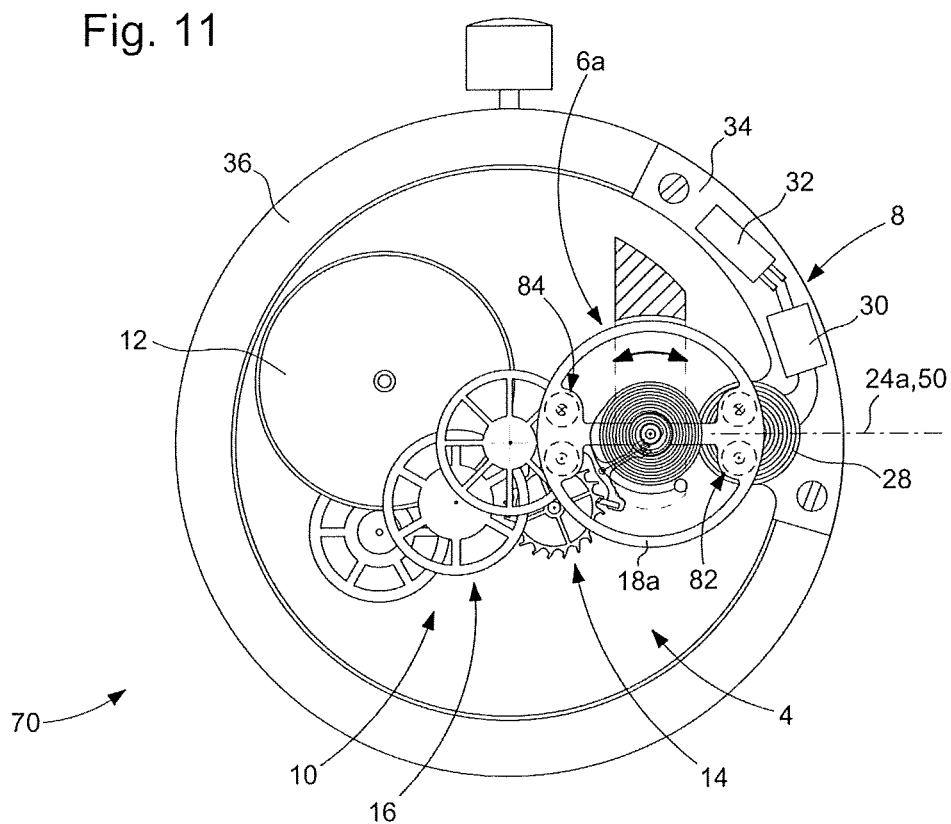
FIG. 11 is a general top view of a second embodiment of a timepiece according to the invention.

The first and second voltage lobes define, on one hand, first time zones ZT1 each situated before the first time $t_1$ of a different first voltage lobe and after the second time $t_2$ of the second voltage lobe preceding this first voltage lobe and, on the other, second time zones ZT2 each situated before the second time $t_2$ of a different second voltage lobe and after the first time $t_1$ of the first voltage lobe preceding this second voltage lobe. The first voltage lobes $LU_1$ generate pulses S1 in the signal 'Comp' at the output of the comparator 64, whereas the second voltage lobes $LU_2$ generate pulses S2 in this signal 'Comp' (FIG. 10C). In the alternative embodiment represented in FIG. 10A, the lobes considered for the generation of the signals S1 and S2 are the positive voltage lobes as a positive threshold voltage $U_{th}$ has been chosen. In an alternative embodiment which shall not be described in more detail hereinafter, it is possible to choose a negative threshold supplied at the input '+' of the comparator 64 (the induced voltage signal then being supplied at the input '−' thereof) and the negative voltage lobes generate the signals S1 and S2.

Then, the braking device is arranged such that, at least when no time drift is detected by the measuring device and at least when the load connected to the terminals $V_{SS}$ and $V_{DD}$ consumes continuously or quasi-continuously electrical energy stored in the power supply capacitor $C_{AL}$ (during a normal functioning phase of the timepiece, as represented in FIG. 10A where the power supply voltage $U_{AL}(t)$ has a certain negative slope in the absence of correction of the functioning of the mechanical oscillator), the first voltage lobes $LU_1$ and the second voltage lobes $LU_2$ generate alternately induced current pulses P1 and P2 (FIG. 10B) which recharge the power supply capacitor. It shall be noted that the electric converter 56 comprises a diode D1 arranged such that only the positive voltage lobes are suitable for recharging the capacitor $C_{AL}$. However, in an alternative embodiment which shall not be described in more detail hereinafter, the electric converter may have a diode arranged so as to define a single-alternation rectifier such that the negative voltage lobes are suitable for recharging the capacitor $C_{AL}$. In this case, it is thus the negative voltage lobes which generate induced current pulses and which are considered to determine the time zones for extraction of a certain electric load and substantial rendering of this electric load according to the time drift measured, as described hereinafter. It shall be noted that in a further alternative embodiment, the converter may comprise a double-alternation converter. In this case, upon each passage of the magnet 22 in front of the coil 28 a first pair of first consecutive voltage lobes or a second pair of two second consecutive voltage lobes all having substantially the same amplitude are obtained. Duplicates of the first of second voltage lobes described above are therefore obtained. This particular case must be considered with reference to the above disclosure taking the first and second pairs of voltage lobes instead of the first and second voltage lobes, and taking to determine the first and second time zones ZT1 and ZT2 the times $t_1$ and $t_2$ of the two adjacent lobes of two pairs following each other.

The load pump 60 is arranged to be able to extract on request a certain electric load from the power supply capacitor $C_{AL}$, so as to momentarily reduce the voltage level $U_{AL}(t)$ of this power supply capacitor. Once the power supply capacitor $C_{AL}$ has been sufficiently charged to be able to power the regulation circuit 54, the logic control circuit 62 receives as an input a measurement signal supplied by the measuring device, namely from the bidirectional counter CB. This logic control circuit is arranged to activate the load pump 60 such that, when the time drift measured corresponds to at least one certain gain (CB>N1), it extracts a first electric load from the power supply capacitor $C_{AL}$ in a first time zone ZT1. This results in a decrease in the voltage $U_{AL}(t)$. The logic control circuit 62 is further arranged to activate the load pump such that it renders at least mostly said first electric load to the power supply capacitor in a second time zone ZT2. This then results in an increase in the voltage $U_{AL}(t)$. Similarly, the logic control circuit is arranged to activate the load pump 60 such that, when the time drift measured corresponds to at least one certain loss (CB<−N2), it extracts a second electric load from the power supply capacitor $C_{AL}$ in a second time zone ZT2, to lower the voltage $U_{AL}(t)$, and such that this load pump renders at least mostly said second electric load to the power supply capacitor in a first time zone ZT1 to then increase the voltage $U_{AL}(t)$.

In the first embodiment, the load pump comprises at least two temporary storage capacitors as well as switches and at least one switch suitable for being controlled by the logic control circuit so as to either arrange the at least two temperature storage capacitors in parallel, or arrange these at least two temporary storage capacitors in series. The first electric load and the second electric load which are each extracted from the power supply capacitor are each stored temporarily in the at least two temporary storage capacitors until the substantial rendering of this first electric load, respectively of this second electric load to the power supply capacitor.

Preferably, the second time zone ZT2, during which the at least partial rendering of a first electric load to the power supply capacitor occurs, is that which occurs first after the first time zone ZT1 during which the extraction of this first electric load occurs. Similarly, the first time zone ZT1, during which the at least partial rendering of a second electric load to the power supply capacitor occurs, is that which occurs first after the second time zone ZT2 during which the extraction of this second electric load occurs.

Figure 9:
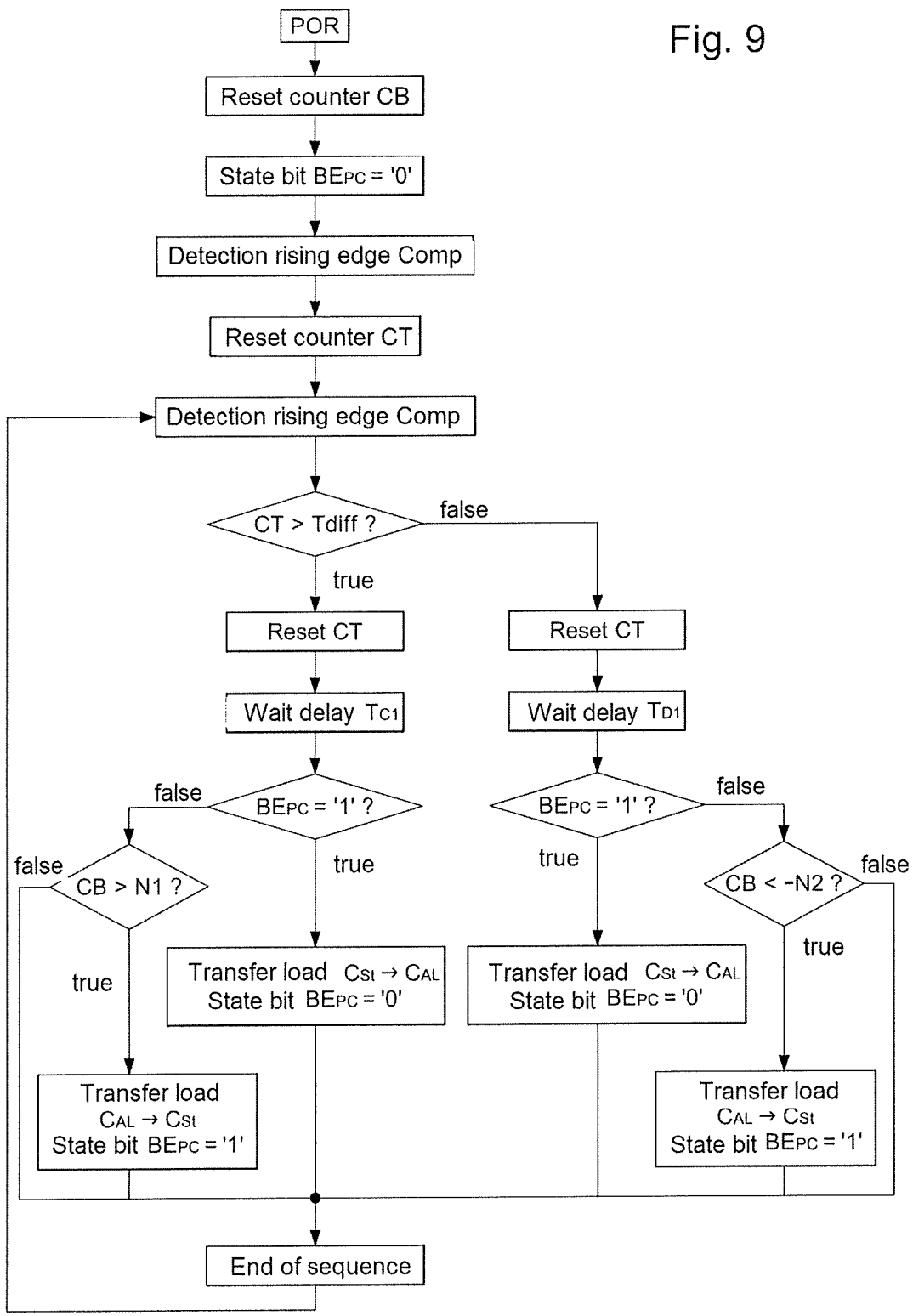
FIG. 9 is a flow chart of a method for regulating the running of the timepiece according to the first embodiment.

The regulation method implemented in the first embodiment of the invention is given in flow chart form in FIG. 9. After an initialization of the regulation circuit to 'POR', the counter CB and the state bit $BE_{PC}$ are reset, the latter indicating the state of the load pump ($BE_{PC}$='0' indicates that the two switchable capacitors $C_{St}$ are in a state suitable for being able to extract a certain electric load from the power supply capacitor, whereas $BE_{PC}$='1' indicates that the two switchable capacitors $C_{St}$ have received a certain load from the power supply capacity and are therefore in a state suitable for being able to render substantially this certain electric load to the power supply capacitor). Then, the detection of a rising edge of a pulse S1 or S2 supplied by the comparator 64 in the signal 'Comp' is awaited (see FIG. 10C) which it transmits to the logic control circuit 62, and the time counter CT is then initialized. Then, the detection of the rising edge in the signal 'Comp' (second rising edge of a pulse S2 or S1) is awaited.

On the detection of the second rising edge mentioned above in the signal 'Comp', the logic circuit 62 transfers the state/the value of the time counter CT into a register and compares this value to a differentiation value Tdiff which is selected less than a first time interval between a first pulse S1 and a second pulse S2 and greater than a second time interval between a second pulse S2 and a first pulse S1. Once the state of the time counter CT has been transferred into the register, this time counter is reset and a timer associated with the logic circuit 62 is engaged to measure a certain delay wherein the value $T_{C1}$ or $T_{D1}$ is selected according to the result of the comparison of the value of the counter CT with the value Tdiff. In the first embodiment, the regulating device therefore comprises a detection device, arranged to be able to detect the successive appearance alternately of first voltage lobes and second voltage lobes, and a time counter CT associated with the logic control circuit 62 to enable the latter to distinguish a first time interval, separating a first voltage lobe from a subsequent second voltage lobe, and a second time interval separating a second voltage lobe from a subsequent first voltage lobe, the first and second time intervals being different due to the arrangement of the electromagnetic assembly.

The arrangement of the electromagnetic assembly is envisaged herein such that the curve of the induced voltage signal Ui(t) exhibits two voltage lobes $LU_2$ and $LU_1$, with the same maximum amplitude ($UM_2=UM_1$), which occur in a second half-alternation and in the subsequent first half-alternation, but no voltage lobe of substantially the same amplitude is generated in the subsequent two half-alternations. The curve of the induced voltage signal Ui(t) represented in FIG. 10A results from the electromagnetic assembly 27 described above. In the first embodiment, the coil 28 exhibits at the center thereof an angular lag θ relative to the reference half-axis 48 (FIG. 2; angular position of the magnet 22 when the mechanical resonator 6 is in the rest position thereof) so as to generate in each oscillation period of the mechanical resonator, in said effective functioning range, merely two voltage lobes of the same polarity and substantially the same maximum amplitude which occur in two consecutive half-alternations and which form respectively one of said second voltage lobes and one of said first voltage lobes. Preferably, this angular lag θ is between 30° and 120° in absolute values.

During the above-mentioned comparison between the value of the time counter CT and the differentiation value Tdiff, the timer associated with the logic circuit waits either a delay $T_{C1}$ when the value of the time counter CT is greater than the differentiation value Tdiff, or a delay $T_{D1}$ when the value of the time counter CT is less than the differentiation value Tdiff. In the first case, the comparison makes it possible to ascertain whether the pulse detected is a pulse S2 generated by a second voltage lobe $LU_2$ and the delay $T_{C1}$ is chosen so that it ends in a first time zone ZT1 following this second voltage lobe. In the second case, the comparison makes it possible to ascertain whether the pulse detected is a pulse S1 generated by a first voltage lobe $LU_1$ and the delay $T_{D1}$ is chosen so that it ends in a second time zone ZT2 following this first voltage lobe. As a general rule, the regulating device comprises a timer associated with the logic control circuit to enable the latter to activate, if required, the load pump device at a first predetermined time since the appearance of a second voltage lobe, this first time being situated in a first time zone, or at a second predetermined time since the appearance of a first voltage lobe, this second time being situated in a second time zone.

In the first case mentioned above, when the delay $T_{C1}$ is reached, it is determined whether the logical value of the state bit $BE_{PC}$ is equal to '0' or '1'. If this logical value is equal to '0', then it is detected whether the counter CB, indicating a potential time drift of the mechanical oscillator, has a value greater than a given natural number N1 (positive number or equal to zero). If this is the case, the mechanical oscillator exhibits a gain relative to the auxiliary oscillator. To correct such a gain, it is envisaged according to the invention to transfer a first electric load from the power supply capacitor in the load pump at the end of the delay $T_{C1}$ mentioned above and therefore in the corresponding first time zone ZT1. The resulting decrease in the power supply voltage $U_{AL}(t)$ generates, upon the appearance of the first voltage lobe following the above-mentioned transfer, an induced current pulse having an amplitude greater than that of the pulse P1 which would occur in the absence of activation of the load pump. This increase in the induced current in the coil 28 means greater mechanical energy taken from the mechanical oscillator by the braking device in a first half-alternation. As described above, braking in a first half-alternation induces a negative time-lag in the oscillation of the mechanical resonator 6, and thus the duration of the alternation in question is increased. Due to the more intense braking performed in a first half-alternation, the instantaneous frequency of the mechanical oscillator is momentarily reduced and this results in a certain loss in the running of the mechanism for which it sets the speed, which corrects at least partially the gain detected by the measuring device. If the logical value of the state bit $BE_{PC}$ is equal to '1', then this indicates that a second electric load has been extracted before the appearance of the second voltage lobe $LU_2$ having generated the pulse S2 in question (namely upon the appearance of a preceding first voltage lobe $LU_1$, which corresponds to the second case discussed hereinafter). This second electric load is then substantially rendered to the power supply capacitor, preferably in the first time zone ZT1 following the second voltage lobe $LU_2$ in question.

In the second case mentioned above, when the delay $T_{D1}$ is reached, it is determined whether the logical value of the state bit $BE_{PC}$ is equal to '0' or '1'. If this logical value is equal to '0', then it is detected whether the counter BC has a value less than a given negative number—N2, N2 being a natural number. If this is the case, the mechanical oscillator exhibits a loss relative to the auxiliary oscillator (case corresponding to FIGS. 10A and 10B). To correct such a loss, it is envisaged according to the invention to transfer a second electric load from the power supply capacitor in the load pump at the end of the delay $T_{D1}$ mentioned above and therefore in the corresponding second time zone ZT2. The resulting decrease in the power supply voltage $U_{AL}(t)$ (indicated by the reference $PC_2$ in FIG. 10A) generates, upon the appearance of the second voltage lobe following the above-mentioned transfer, an induced current pulse $P2^{PC}$ having an amplitude greater than that of the pulse P2 which would occur in the absence of regulation. This increase in the induced current in the coil 28 means greater mechanical energy drawn from the mechanical oscillator by the braking device in a second half-alternation $DA2^P$. As described above, braking in a second half-alternation induces a positive time-lag in the oscillation of the mechanical resonator, and thus the duration of the alternation in question is reduced. Due to the more intense braking performed in a second half-alternation, the instantaneous frequency of the mechanical oscillator is momentarily increased and this results in a certain gain in the running of the mechanism for which it sets the speed, which corrects at least partially the gain detected by the measuring device. If the logical value of the state bit $BE_{PC}$ is equal to '1', then this indicates that a first electric load has been extracted before the appearance of the first voltage lobe $LU_1$ having generated the pulse S1 in question (namely upon the appearance of a preceding second voltage lobe $LU_2$, which corresponds to the first case discussed above). This first electric load is then substantially rendered to the power supply capacitor, preferably in the second time zone ZT2 following the first voltage lobe $LU_1$ in question.

Extraction of an electric load in a first time zone ZT1 at the end of the delay $T_{C1}$ therefore generates an induced current pulse of greater amplitude in a corresponding first half-alternation, this first half-alternation having a duration greater than those of the second half-alternations $DA1^0$ and $DA1^1$ which correspond respectively to a half-alternation during which no induced current pulse is generated and to a half-alternation during which a compensation pulse P1 of the electrical consumption of the load occurs. In the case represented in FIGS. 10A and 10B, an electric load was extracted in a second time zone ZT2 at the end of the delay $T_{D1}$, indicated by the reference $PC_2$ which indicates a descending step in the power supply voltage $U_{AL}(t)$. As mentioned, this results in an induced current pulse $P2^{PC}$ of greater amplitude in the second half-alternation $DA2^P$ of the alternation A1, this second half-alternation having a duration less than the second half-alternations $DA2^0$ and $DA2^1$ which correspond respectively to a half-alternation during which no induced current pulse is generated and to a half-alternation during which a compensation pulse P2 of the electrical consumption of the load occurs.

In the second case described above and following the extraction of an electric load having generated the induced current pulse $P2^{PC}$ in the second half-alternation $DA2^P$, the regulation method, in the following sequence in FIG. 9, detects the rising edge of the following pulse S2 in the signal 'Comp', which has generated the induced current pulse $P2^{PC}$. The time interval measured by the counter CT is then herein greater than Tdiff. The logic control circuit therefore waits for a delay $T_{C1}$ and it observes that the state bit $BE_{PC}$ has the logical value '1'. The logic circuit then actuates the load pump so that it renders at the end of the delay $T_{C1}$ substantially the electric load that it has momentarily stored, namely in the first time zone ZT1 (this event is indicated by the reference $RC_1$ in FIG. 10A, which indicates a rising step in the power supply voltage). Recharging the power supply capacitor $C_{AL}$ with the electric load stored in the load pump results in a rise in the power supply voltage $U_{AL}(t)$. In the alternative embodiment shown, this rise in voltage in a first time zone ZT1 results in the maximum voltage $UM_1$ of the first voltage lobe $LU_1$ following the rendering of the electric load being substantially equal to the power supply voltage at the time $t_1$ of the appearance of this maximum voltage, such that no induced current pulse is generated whereas, in the absence of activation of the load pump, a nominal pulse P1 would have been generated.

Thus, in the first half-alternation $DA1^R$ of the alternation A2, there is a reduction in the braking energy relative to the nominal braking energy such that the duration of this first half-alternation is less than the duration $DA1^1$ that this half-alternation would have had with a nominal pulse P1. Indeed, the duration $DA1^R$ is herein equal to the duration $DA1^0$ which corresponds to a first half-alternation without braking of the mechanical resonator by the braking device. This event therefore has a cumulative effect with that having led to generating the pulse $P2^{PC}$, as both induce a positive time-lag in the oscillation of the mechanical resonator and therefore contribute to compensating for the loss detected in the running of the mechanism in question. A similar effect applies in the event of detection of a certain gain in the running of the mechanism. In this case, the extraction of an electric load from the power supply capacitors by the load pump at the end of the delay $T_{C1}$, in a first time zone ZT1 following a second voltage lobe $LU_2$, and the substantial rendering of this electric load to the power supply capacitor in the second time zone ZT2, following the first voltage lobe $LU_1$ occurring first after the appearance of the second voltage lobe mentioned above, have a cumulative effect and both induce a negative time-lag in the oscillation of the mechanical resonator and therefore contribute to a loss in the running of the mechanism in question to compensate for the gain detected.

With the aid of FIGS. 11 to 15 and 16A to 16C, a second embodiment of a timepiece 70 according to the invention shall be described hereinafter. The timepiece movement of this timepiece differs from that shown in FIG. 1 essentially by the configuration of the balance 18a, forming the mechanical resonator 6a, which bears herein two pairs of bipolar magnets 82 and 84. The teachings previously given which arise again herein shall not be described in detail. That which renders this second embodiment remarkable relative to the first embodiment lies in particular in the choice of the electromagnetic assembly 86 forming the electromagnetic transducer and of the regulating device 72. This electromagnetic assembly comprises two pairs 82 and 84 of bipolar magnets 90 and 91, respectively 92 and 93, which are mounted on a balance 18a of the mechanical resonator 6a and which have respective magnetization axes which are parallel with the axis of rotation 20 of the balance, and a coil 28 which is rigidly connected to the support of the mechanical resonator.

Figure 12:
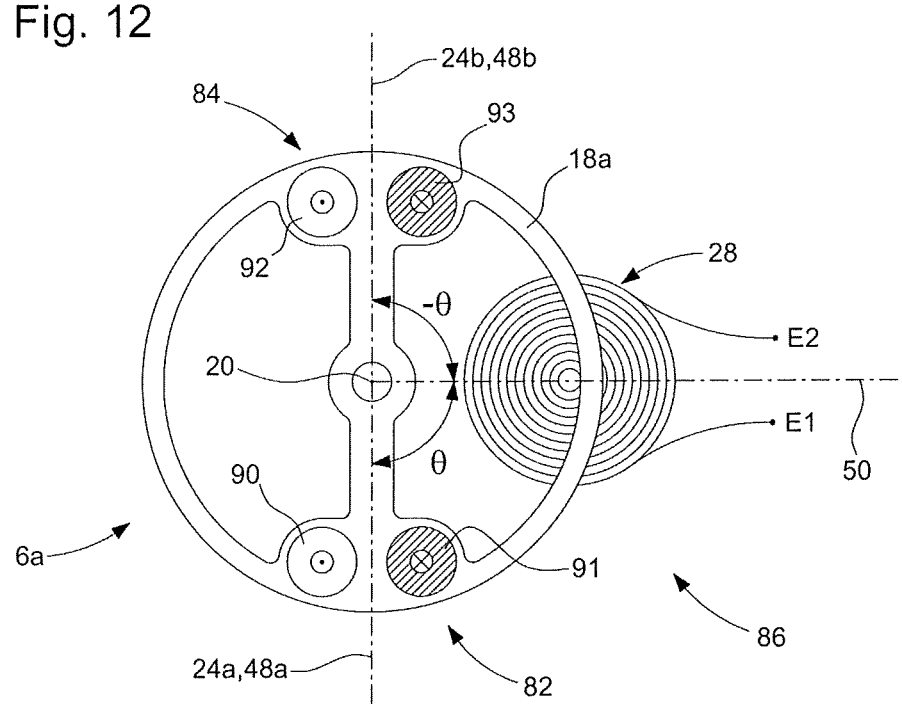
FIG. 12 is an enlarged partial view of the timepiece in FIG. 11, showing the particular arrangement of the electromagnetic transducer thereof.
Figure 13:
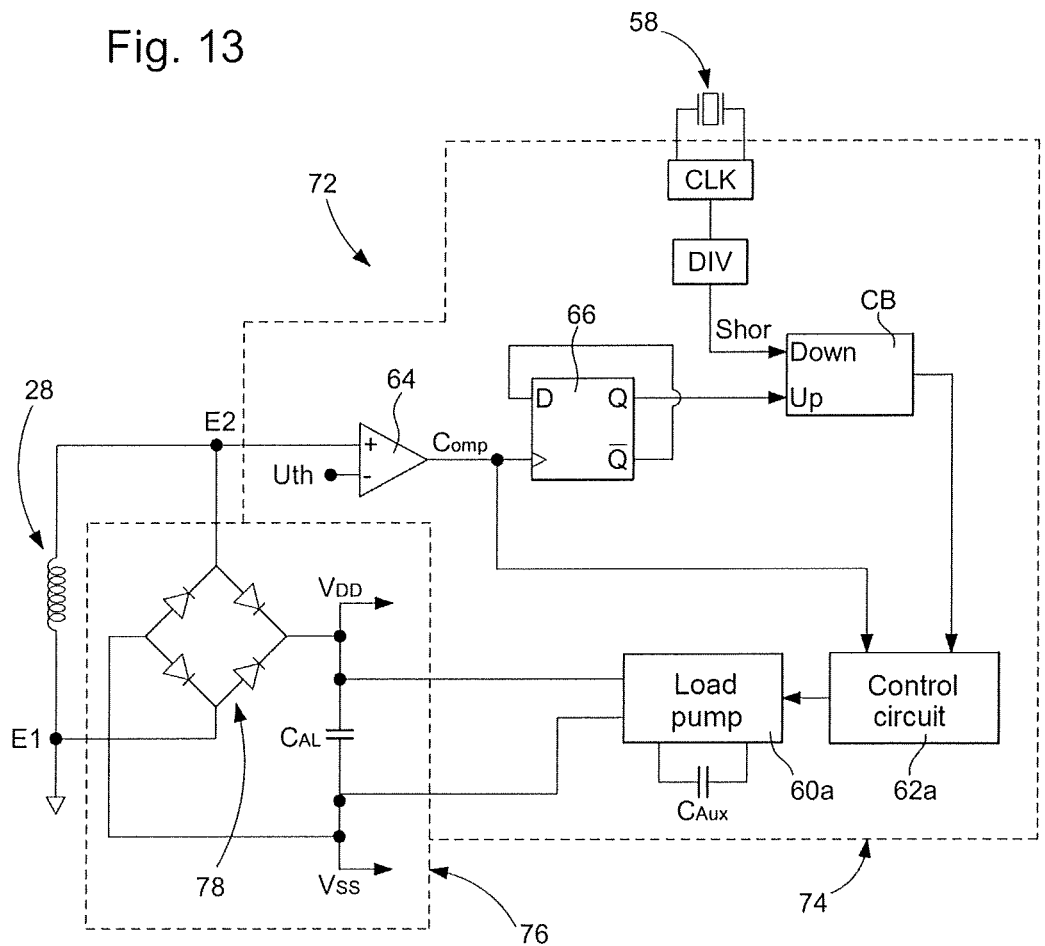
FIG. 13 shows the electrical diagram of the electric converter and the regulating device of the mechanical oscillator as arranged in the second embodiment of the timepiece.
Figure 14:
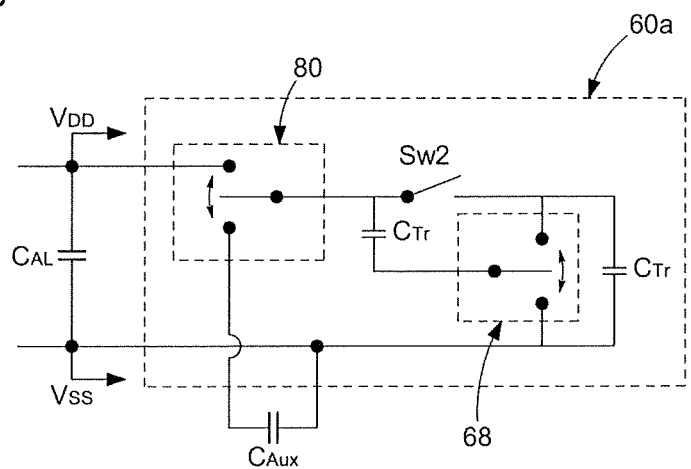
FIG. 14 shows the electronic circuit of the load pump forming the regulating device represented in FIG. 13.

The two bipolar magnets of each of the two pairs 82 and 84 have opposite respective polarities and are arranged such that the respective magnetic fluxes thereof pass through, in each alternation, the coil 28 with a time-lag but at least in part a simultaneity of the incoming magnetic flux and the outgoing magnetic flux. Thus, each pair of magnets and the coil are arranged such that an induced voltage signal generated at the two ends E1, E2 of the coil, upon the passage of this pair of magnets facing this coil, has a central lobe of maximum amplitude resulting from simultaneous coupling of the two magnets with the coil. Each pair of bipolar magnets defines a median half-axis 24a, 24b starting from the axis of rotation 20 of the balance and passing via the midpoint of the pair of bipolar magnets in question. Each median half-axis defines a respective reference half-axis 48a, 48b when the resonator 6a is at rest and thus in the neutral position thereof, as shown in FIG. 12. The coil 28 exhibits at the center thereof a first angular lag θ relative to the first reference half-axis 48a and a second angular lag—θ (same absolute value as the first angular lag, but opposite mathematical sign) relative to the second reference half-axis 48a, so as to induce in each alternation of the mechanical resonator, in an effective functioning range, two central voltage lobes $LUC_1$ and $LUC_2$ having opposite polarities (negative and positive) and substantially the same amplitude $UM_1$, $UM_2$ in absolute values and forming respectively a first voltage lobe and a second voltage lobe (FIG. 16A).

As in the first embodiment, the first and second voltage lobes $LUC_1$ and $LUC_2$ occur respectively in first half-alternations and second half-alternations. The angular lag θ is advantageously between 30° and 120°. Preferably, to poise the balance 18a, the first and second angular lags have an absolute value of 90° (alternative embodiment represented in FIGS. 11 and 12). The two pairs of magnets 82 and 84 are arranged such that the polarities of the magnets of one pair are symmetrical with the polarities of the magnets of the other pair relative to a plane passing via the center of the coil and comprising the axis of rotation 20 (this plane comprising the half-axis 50 passing via the center of the coil and perpendicularly intercepting the axis of rotation 20). It shall be noted that the alternative embodiment of the second embodiment described with reference to the figures is an enhanced alternative embodiment. In a further alternative embodiment which shall not be described in more detail hereinafter, a single pair of magnets is envisaged having an angular lag between 30° and 120° (in absolute values). This further alternative embodiment comprises a regulation circuit without the control 66. The regulation method remains similar and those skilled in the art will be able to adapt it to this particular alternative embodiment.

Figure 16A:
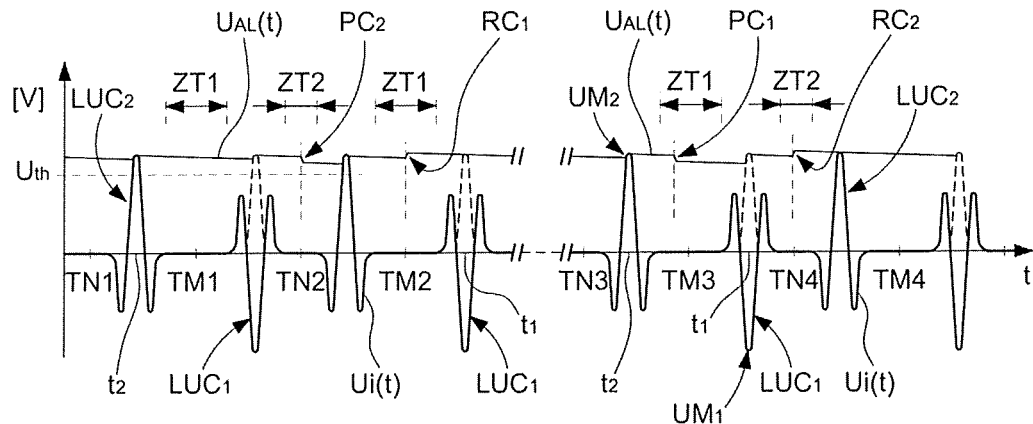
FIGS. 16A to 16C represent various electrical signals arising in the electrical diagram in FIG. 13.
Figure 16B:
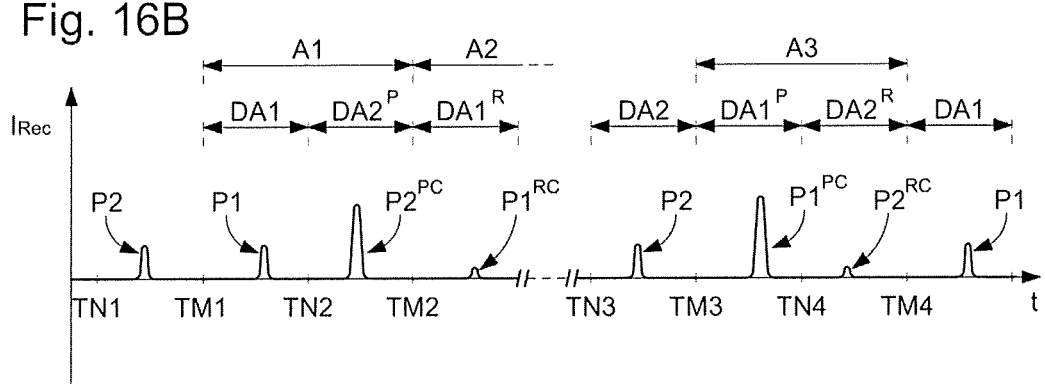

The induced voltage signal Ui(t), represented in FIG. 16A, exhibits alternately voltage lobes $LUC_1$ having a negative voltage and voltage lobes $LUC_2$ having a positive voltage. The electric converter 76 comprises a double-alternation rectifier 78 formed by a bridge of four diodes well-known to those skilled in the art. Thus, at the output of the rectifier 78, the first voltage lobes are rectified, which is represented in FIG. 16A by lobes with broken lines. As in the first embodiment, in the absence of activation of the load pump 60a, the first and second voltage lobes $LUC_1$ and $LUC_2$ recharge alternately the power supply capacitor $C_{AL}$ which particularly powers the regulation circuit 74. Given that there are two pairs of magnets, each alternation exhibits a first voltage lobe in a first half-alternation and a second voltage lobe in a second half-alternation. As the signal 'Comp' has two pulses per oscillation period, a control 66 is envisaged upstream from the bidirectional counter CB so as to inhibit one pulse out of every two in the signal supplied to this counter. A particular feature of this second embodiment lies in the opposite polarities of the first and second voltage lobes. The alternative embodiment represented in FIGS. 16A and 16C envisages a positive threshold voltage Uth whereas the first voltage lobes are negative. It shall be easily understood that merely inverting the ends E1 and E2 of the coil 28 reverses the situation, which would then generate positive first voltage lobes and negative second voltage lobes. The threshold voltage may be chosen as positive or negative. These choices determine the times at which the pulses S2 or S1 occur (see FIG. 10C) in the signal 'Comp' supplied by the comparator 64. Thus, the regulating device comprises a detection device which is arranged to be able to detect the successive appearance of first voltage lobes or second voltage lobes. Note that it is also possible to envisage detecting alternately these first and second voltage lobes using two comparators having as an input respectively a positive voltage threshold and a negative voltage threshold. Those skilled in the art will be able to adapt the regulation method implemented in the logic control circuit 62a accordingly, in particular for the determination of the delays $T_{C2}$ and $T_{D2}$.

The load pump device of the regulation circuit 74 (FIG. 13) is formed from a load pump 60a and an auxiliary temporary electrical energy storage capacitor $C_{Aux}$. The load pump 60a comprises at least two transfer capacitors $C_{Tr}$, a switch Sw2 and two switches 68 and 80 suitable for being controlled by the logic control circuit 62a so as to either arrange the two transfer capacitors in parallel, or arrange these two transfer capacitors in series. This load pump device differs from that of the first embodiment in that the logic control circuit is arranged so that at least most of an electric load extracted from the power supply capacitor $C_{AL}$ can be transferred by the load pump in the auxiliary capacitor $C_{Aux}$ wherein it is stored temporarily until the at least partial rendering of this electric load to the power supply capacitor via the load pump. This particular arrangement enables the logic control circuit to extract an electric load from the power supply capacitor in a plurality of transfer cycles of a lesser electric load between the power supply capacitor and the auxiliary capacitor via the load pump. This plurality of transfer cycles is carried out in a first time zone ZT1 or a second time zone ZT2. Similarly, the at least partial rendering of said electric load to the power supply capacitor may be carried out in a plurality of transfer cycles of a lesser electric load between the auxiliary capacitor and the power supply capacitor via the load pump. Such an arrangement therefore makes it possible to extract according to the invention a certain electric load from the power supply capacitor which is considerably greater than that suitable for being momentarily stored in the two transfer capacitors. Thus, these transfer capacitors may have a relatively low value and the auxiliary capacitor have a considerably greater value suitable for the electric loads that it is envisaged to extract momentarily to regulate the mechanical oscillator.

Figure 16C:
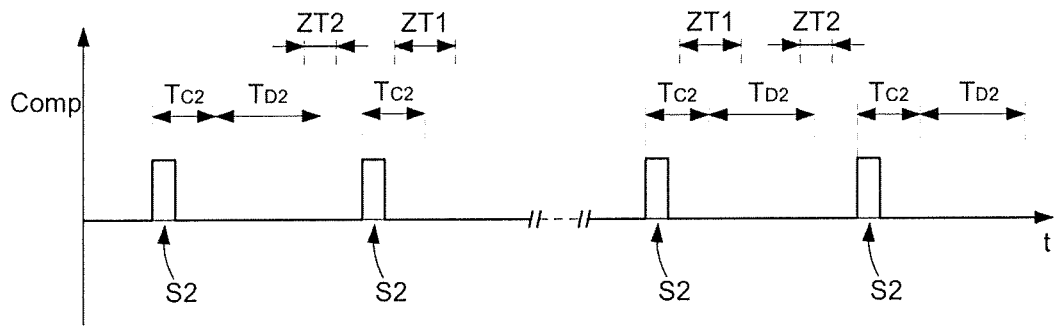

As previously mentioned, the second embodiment differs from the first in particular in that the electromagnetic assembly 86 is arranged such that the first voltage lobe and the second voltage lobes have opposite polarities, such that a comparator 64 can detect directly either the first voltage lobes, or the second voltage lobes (case represented in FIG. 20A). It is therefore herein not necessary to have to differentiate in the pulses supplied by the comparator those corresponding to the first lobes from those corresponding to the second lobes, which is the reason why there is no time counter CT, but merely a timer associated with the logic control circuit, which may be integrated inside this logic circuit, to measure two delays $T_{C2}$ and $T_{D2}$. In FIG. 16C, it is observed that the signal 'Comp' exhibits merely pulses S2 which each correspond to the appearance of a second voltage lobe $LUC_2$. The functioning principle of the regulation system according to the invention shall not be described again in detail, but essentially the distinctive features.

Figure 15:
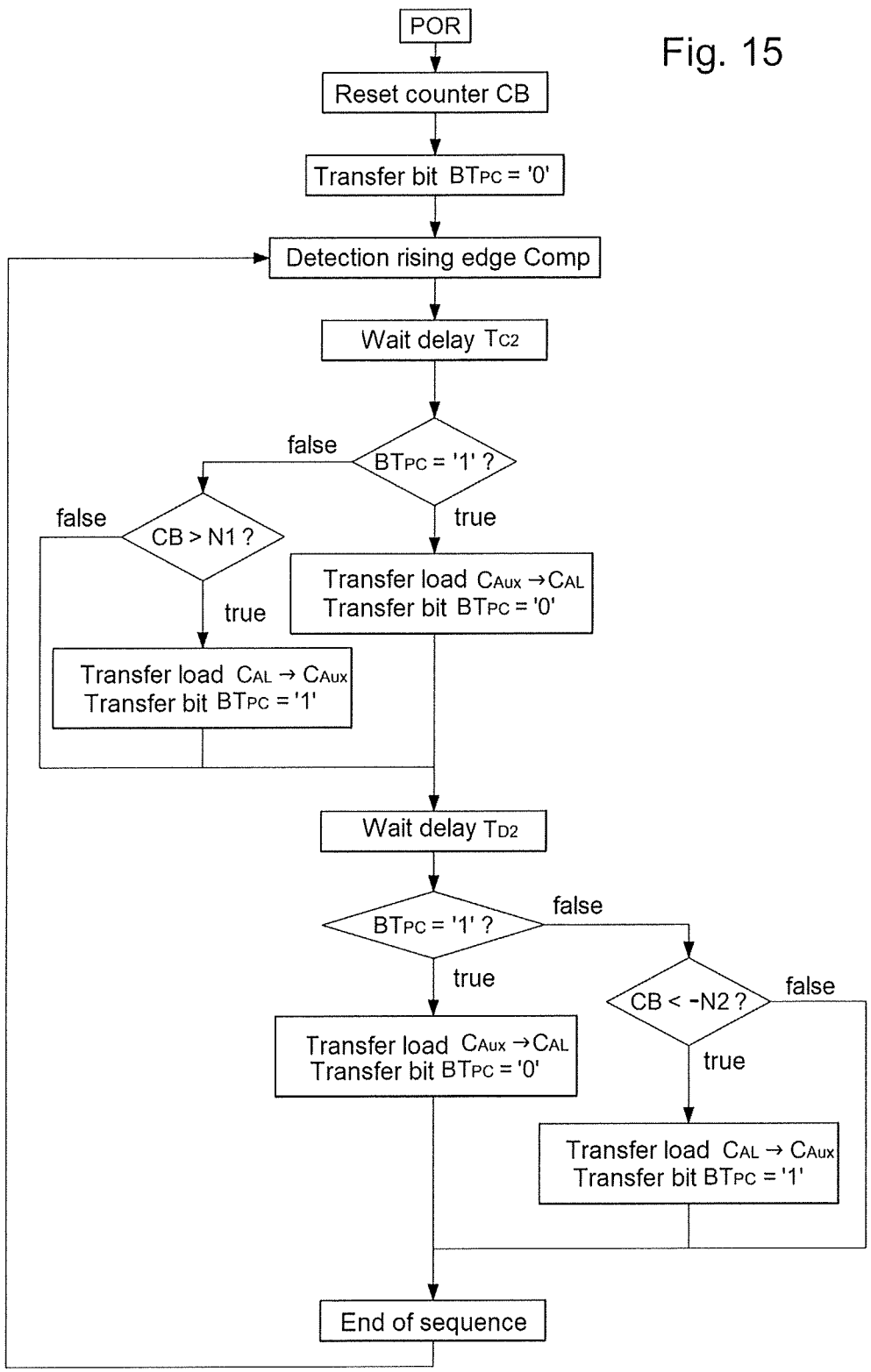
FIG. 15 is a flow chart of a method for regulating the running of the timepiece according to the second embodiment.

FIG. 15 is a flow chart of the regulation method implemented in the logic control circuit 62a. When the regulation device 72 is started, the regulation circuit 74 is set to 'POR', in particular the bidirectional counter CB. The logic circuit has a memory bit $BT_{PC}$ (hereinafter referred to as transfer bit) which saves the transfers of electric loads between the power supply capacitor $C_{AL}$ and the auxiliary capacitor $C_{Aux}$ and vice versa. When an extraction of an electric load in a first or second time zone is carried out, the transfer bit is set to '1'. Then, upon the at least partial and generally majority rendering of the electric load to the power supply capacitor respectively in a second or first time zone, preferably the next, the transfer bit is set to '0'. This transfer bit is initially set to the logical value '0' since no extraction has yet taken place.

The logic circuit then waits for the appearance of a pulse S2, namely in particular the rising edge thereof. The detection of this rising edge triggers the timer which measures a first time interval $T_{C2}$ the duration whereof is chosen such that the end thereof occurs in a first time zone ZT1 situated temporally between a second voltage lobe $LUC_2$ and a first voltage lobe $LUC_1$, particularly between the time $t_2$ and the time $t_1$ where these two lobes exhibit respectively the maximum values $UM_2$ and $UM_1$ thereof (FIG. 16A). At the end of the delay $T_{C2}$, if the transfer bit $BT_{PC}$ is set to '0', the logic circuit detects whether the value of the bidirectional counter CB is greater than a natural number N1. If this is the case, it then orders the transfer of a first electric load from the power supply capacitor in the auxiliary capacitor of the load pump device. Such an event induces a descending step $PC_1$ in the power supply voltage $U_{AL}(t)$ and the next induced current pulse $P1^{PC}$ that occurs in a first half-alternation then has an amplitude greater than that of a pulse P1 in the absence of prior extraction of an electric load (see right-hand section of FIG. 16A to FIG. 16C). If the counter CB has a value equal to or less than the natural number N1, then the logic circuit waits for a second delay $T_{D2}$ directly following the first delay to come to an end (FIG. 16C). This second delay $T_{D2}$ is chosen such that the end thereof occurs in a second time zone ZT2 situated between a first voltage lobe $LUC_1$ and a second voltage lobe $LUC_2$, in particular in the second time zone adjacent to the first time zone mentioned above. If at the end of the first delay $T_{C2}$ the transfer bit $BT_{PC}$ is set to '1', indicating that an extraction has been previously carried out, the logic circuit controls the load pump 60a so that it renders at least partially a second electric load, preferably at least most of the second electric load extracted, to the power supply capacitor in the first time zone in question. Such an event induces a rising step $RC_1$ in the power supply voltage $U_{AL}(t)$ and the next induced current pulse $P1^{RC}$ that occurs in a first half-alternation then has an amplitude less than that of a pulse P1 in the absence of prior extraction of an electric load and rendering thereof (see left-hand section of FIG. 16A to FIG. 16C).

From the end of a first time interval $T_{C2}$, the timer starts to measure a second time interval $T_{D2}$. At the end of the delay $T_{D2}$, if the transfer bit $BT_{PC}$ is set to '0', the logic circuit detects whether the value of the bidirectional counter CB is less than a number—N2, where N2 is a natural number. If this is the case, it then orders the transfer, during the second time zone ZT2 in question, of a second electric load from the power supply capacitor in the auxiliary capacitor of the load pump device. Such an event induces a descending step $PC_2$ in the power supply voltage $U_{AL}(t)$ and the next induced current pulse $P2^{PC}$ that occurs in a second half-alternation then has an amplitude greater than that of a pulse P2 in the absence of prior extraction of an electric load (see left-hand section of FIG. 16A and FIG. 16B). If the counter CB has a value equal to or greater than the number—N2, then the logic circuit ends the sequence and waits for the detection of a new pulse S2 to start the next sequence. If at the end of the second delay $T_{D2}$ the transfer bit $BT_{PC}$ is set to '1', indicating that an extraction has been previously carried out, the logic circuit controls the load pump 60a so that it renders at least in part a first electric load, preferably at least most of the first electric load extracted, to the power supply capacitor in the second time zone in question. Such an event induces a rising step $RC_2$ in the power supply voltage $U_{AL}(t)$ and the next induced current pulse $P2^{RC}$ that occurs in a second half-alternation then has an amplitude less than that of a pulse P2 in the absence of prior extraction of an electric load and rendering thereof (see right-hand section of FIG. 16A and FIG. 16B). It shall be noted that the pulses $P1^{RC}$ and $P2^{RC}$ may not appear, which then corresponds to a lack of induced current in the coil 28. After having carried out the at least partial rendering of said first electric load, the logic circuit ends the sequence in progress. It shall be noted that the at least partial rendering of an extracted electric load is carried out in a normal functioning phase of the regulating device, which may follow an initial regulation phase during which the auxiliary capacitor $C_{Aux}$ is firstly charged to a certain voltage level. Thus, as in the first embodiment, a loss or a gain observed in the running of the mechanism in question is corrected firstly by the selective extraction of an electric load and secondly by the selective rendering of at least part of this electric load.

Finally, in one alternative embodiment, the logic control circuit is arranged so as to be able to perform, when the time drift measured corresponds to said at least one certain gain, a plurality of extractions of electric loads respectively in a plurality of first time zones. Similarly, when the time drift measured corresponds to at least one certain loss, a plurality of extractions of electric loads respectively in a plurality of second time zones are carried out. Each extraction of an electric load is followed by at least partial rendering thereof, as disclosed. In other words, after a detection of a certain time drift, the value whereof is for example greater than a second level of detection indicating a relatively large time drift, the logic control circuit automatically performs a plurality of extraction—rendering cycles of an electric load according to the invention, particularly in a plurality of oscillation periods which may be consecutive or not.

The invention claimed is:
1. A timepiece, comprising:
   a mechanism,
   a mechanical resonator suitable for oscillating about a neutral position corresponding to the minimal mechanical potential energy state thereof, each oscillation of the mechanical resonator defining an oscillation period and having two successive alternations each between two extreme positions which define an oscillation amplitude of the mechanical resonator, each alternation having a passage of the mechanical resonator via the neutral position thereof at a median time and consisting of a first half-alternation between an initial time of said alternation and the median time thereof and a second half-alternation between this median time and an end time of said alternation,
   a maintenance device of the mechanical resonator forming with said mechanical resonator a mechanical oscillator which defines a running speed of said mechanism,
   an electromechanical transducer arranged to be able to convert mechanical power from the mechanical oscillator into electrical power when the mechanical resonator oscillates with an amplitude included in an effective functioning range, said electromechanical transducer being formed by an electromagnetic assembly comprising at least one coil, mounted a mechanical assembly consisting of the mechanical resonator and a support thereof, and at least one magnet mounted on the mechanical assembly, the electromagnetic assembly being arranged so as to be able to supply an induced voltage signal between two output terminals of the electromechanical transducer at least when the mechanical resonator oscillates with an amplitude included in the effective functioning range,
   an electric converter connected to the two output terminals of the electromechanical transducer so as to be able to receive an induced electric current from said electromechanical transducer, said electric converter comprising a power supply capacitor arranged to store electrical energy supplied by the electromechanical transducer, said electromechanical transducer and the electric converter forming a braking device of the mechanical resonator together which is arranged such that a quantity of electrical energy supplied to the power supply capacitor during recharging increases as a voltage level of said power supply capacitor lowers, a load connected or suitable for being regularly connected to the electric converter and powered by the power supply capacitor, and a regulating device for regulating a frequency of the mechanical oscillator, said regulating device comprising an auxiliary oscillator and a measuring device arranged to be able to detect a potential time drift of the mechanical oscillator relative to the auxiliary oscillator, the regulating device being arranged to be able to determine whether the time drift measured corresponds to at least one certain gain;

wherein the braking device is arranged such that, in each oscillation period of the mechanical resonator when the oscillation amplitude of said mechanical resonator is in the effective functioning range, the induced voltage signal exhibits a first voltage lobe occurring at least mostly in a first half-alternation or in each of the two first half-alternations and a second voltage lobe occurring at least mostly in a second half-alternation or in each of the two second half-alternations;

wherein the braking device is arranged such that, at least when no time drift is detected by the measuring device and at least when said load consumes continuously or quasi-continuously electrical energy stored in the power supply capacitor during a normal functioning mode of the timepiece, each first voltage lobe and each second voltage lobe is suitable for generating an induced current pulse which recharges the power supply capacitor;

wherein each first voltage lobe exhibits, in absolute values, a first maximum value at a first time of the corresponding first half-alternation and each second voltage lobe exhibits, in absolute values, a second maximum value at a second time of the corresponding second half-alternation, the first and second voltage lobes defining, on one hand, first time zones each situated before said first time of a different first voltage lobe and after the second time of the second voltage lobe preceding said first voltage lobe and, on the other, second time zones each situated before said second time of a different second voltage lobe and after the first time of the first voltage lobe preceding said second voltage lobe;

wherein the regulating device comprises a load pump device arranged to be able to extract on request an electric load from the power supply capacitor, so as to momentarily reduce the voltage level of said power supply capacitor; and wherein the regulating device further comprises a logic control circuit which receives as an input a measurement signal supplied by the measuring device and which is arranged to activate the load pump device so that, when the time drift measured corresponds to said at least one certain gain, the logic control circuit extracts a first electric load from the power supply capacitor in a first time zone among said first time zones, the logic control circuit being further arranged to activate the load pump device so that the logic control circuit renders, in a normal functioning phase of the load pump device, at least partially the first electric load to the power supply capacitor in a second time zone among said second time zones.

2. The timepiece according to claim 1, wherein said second time zone, during which at least partial rendering of said first electric load to the power supply capacitor occurs, is that which occurs first after the first time zone during which the extraction of said first electric load occurs.

3. The timepiece according to claim 1, wherein the regulating device is also arranged to be able to determine whether the time drift measured corresponds to at least one certain loss; and wherein said logic control circuit is arranged to activate the load pump device so that, when the time drift measured corresponds to said at least one certain loss, the logic control circuit extracts a second electric load from the power supply capacitor in a second time zone among said second time zones, the logic control circuit being further arranged to activate the load pump device so that the logic control circuit renders, in a normal functioning phase of the regulating device, at least partially said second electric load to the power supply capacitor in a first time zone among said first time zones.

4. The timepiece according to claim 3, wherein said first time zone, during which at least partial rendering of said second electric load to the power supply capacitor occurs, is that which occurs first after the second time zone during which the extraction of said second electric load occurs.

5. The timepiece according to claim 1, wherein the load pump device consists of a load pump comprising at least two temporary storage capacitors and switches and/or switches suitable for being controlled by the logic control circuit so as to either arrange at least two temporary storage capacitors in parallel, or arrange at least two temporary storage capacitors in series; and wherein said first electric load extracted from the power supply capacitor is stored temporarily in at least two temporary storage capacitors until said at least partial rendering of said first electric load to the power supply capacitor, the electric load actually rendered corresponding to most of said first electric load.

6. The timepiece according to claim 3, wherein the load pump device is formed of a load pump comprising at least two temporary storage capacitors and switches and/or switches suitable for being controlled by the logic control circuit so as to either arrange at least two temporary storage capacitors in parallel, or arrange at least two temporary storage capacitors in series; and wherein said first electric load and said second load extracted from the power supply capacitor are each stored temporarily in at least two temporary storage capacitors until said at least partial rendering of said first electric load, respectively said second electric load to the power supply capacitor, the electric load actually rendered corresponding to most of said first electric load, respectively said second electric load.

7. The timepiece according to claim 1, wherein the load pump device is formed of a load pump and an auxiliary temporary electrical energy storage capacitor, the load pump comprising at least two transfer capacitors and switches and/or switches suitable for being controlled by the logic control circuit so as to either arrange at least two transfer capacitors in parallel, or arrange said at least two transfer capacitors in series; and wherein the logic control circuit and the load pump device are arranged so that at least most of said first electric load extracted from the power supply capacitor is transferred via the load pump in the auxiliary capacitor wherein the at least most of the first electric load is stored temporarily until said at least partial rendering of said first electric load to the power supply capacitor via the load pump.

8. The timepiece according to claim 7, wherein the logic control circuit and the auxiliary capacitor are arranged such that said extraction of said first electric load from the power supply capacitor is performed in a plurality of transfer cycles of a lesser electric load between the power supply capacitor and the auxiliary capacitor via the load pump.

9. The timepiece according to claim 8, wherein the logic control circuit and the auxiliary capacitor are arranged such that said at least partial rendering of said first electric load to the power supply capacitor is performed in a plurality of transfer cycles of a lesser electric load between the auxiliary capacitor and the power supply capacitor via the load pump.

10. The timepiece according to claim 3, wherein the load pump device is formed of a load pump and an auxiliary temporary electrical energy storage capacitor, the load pump comprising at least two transfer capacitors and switches and/or switches suitable for being controlled by the logic control circuit so as to either arrange at least two transfer capacitors in parallel, or arrange these at least two transfer capacitors in series; and wherein the logic control circuit and the load pump device are arranged so that at least most of said first electric load and most of said second electric load extracted from the power supply capacitor can each be transferred via the load pump in the auxiliary capacitor wherein they are stored temporarily until said at least partial rendering of said first electric load, respectively said second electric load to the power supply capacitor via the load pump.

11. The timepiece according to claim 10, wherein the logic control circuit and the auxiliary capacitor are arranged such that the extractions of said first electric load and said second electric load from the power supply capacitor are each performed in a plurality of transfer cycles of a lesser electric load between the power supply capacitor and the auxiliary capacitor via the load pump.

12. The timepiece according to claim 11, wherein the logic control circuit and the auxiliary capacitor are arranged such that said at least partial renderings of said first electric load and said second electric load to the power supply capacitor are each performed in a plurality of transfer cycles of a lesser electric load between the auxiliary capacitor and the power supply capacitor via the load pump.

13. The timepiece according to claim 1, wherein the logic control circuit is arranged so as to be able to perform, when the time drift measured corresponds to said at least one certain gain or to at least one given gain greater than the at least one certain gain, extractions of a plurality of electric loads respectively during a plurality of first time zones.

14. The timepiece according to claim 3, wherein the logic control circuit is arranged so as to be able to perform, when the time drift measured corresponds to said at least one certain gain or to at least one given gain greater than the at least one certain gain, extractions of a plurality of electric loads respectively during a plurality of first time zones.

15. The timepiece according to claim 3, wherein the logic control circuit is arranged so as to be able to perform, when the time drift measured corresponds to said at least one certain loss or to at least one loss greater than the at least one certain loss, extractions of a plurality of second electric loads respectively during a plurality of second time zones.

16. The timepiece according to claim 1, wherein said load is formed particularly by the regulating device.

17. The timepiece according to claim 3, wherein said load is formed particularly by the regulating device.

18. The timepiece according to claim 1, wherein the electromagnetic assembly comprises a bipolar magnet, mounted on a balance of the mechanical resonator and having a magnetization axis in a geometric plane comprising an axis of rotation of the balance, and the at least one coil which is rigidly connected to the support of the mechanical resonator and arranged so as to be traversed by the magnetic flux of the bipolar magnet, a median half-axis starting from the axis of rotation of the balance and passing via said axial magnetization axis defining a reference half-axis when the resonator is at rest and thus in the neutral position thereof; and wherein the at least one coil exhibits at the center thereof an angular lag relative to the reference half-axis and said bipolar magnet is arranged on the balance such that mere coupling between said bipolar magnet and the at least one coil can induce in each oscillation period of the mechanical resonator, in said effective functioning range, two voltage lobes of the same polarity which form respectively said first voltage lobe and said second voltage lobe.

19. The timepiece according to claim 3, wherein the electromagnetic assembly comprises a bipolar magnet, mounted on a balance of the mechanical resonator and having a magnetization axis in a geometric plane comprising the axis of rotation of the balance, and the at least one coil which is rigidly connected to the support of the mechanical resonator and arranged so as to be traversed by the magnetic flux of the bipolar magnet, a median half-axis starting from the axis of rotation of the balance and passing via said axial magnetization axis defining a reference half-axis when the resonator is at rest and thus in the neutral position thereof; and wherein the at least one coil exhibits at the center thereof an angular lag relative to the reference half-axis and said bipolar magnet is arranged on the balance such that mere coupling between said bipolar magnet and the at least one coil can induce in each oscillation period of the mechanical resonator, in said effective functioning range, two voltage lobes of the same polarity which form respectively said first voltage lobe and said second voltage lobe.

20. The timepiece according to claim 18, wherein said angular lag is between 30° and 120° in absolute values.

21. The timepiece according to claim 19, wherein said angular lag is between 30° and 120° in absolute values.

22. The timepiece according to claim 18, wherein the regulating device comprises a detection device, arranged to be able to detect alternately the successive appearance of first voltage lobes and second voltage lobes, and a time counter associated with the logic control circuit to enable the latter to distinguish a first time interval, separating a first voltage lobe from a subsequent second voltage lobe, and a second time interval separating a second voltage lobe from a subsequent first voltage lobe, the first and second time intervals being different due to the arrangement of said electromagnetic assembly.

23. The timepiece according to claim 19, wherein the regulating device comprises a detection device, arranged to be able to detect alternately the successive appearance of first voltage lobes and second voltage lobes, and a time counter associated with the logic control circuit to enable the latter to distinguish a first time interval, separating a first voltage lobe from a subsequent second voltage lobe, and a second time interval separating a second voltage lobe from a subsequent first voltage lobe, the first and second time intervals being different due to the arrangement of said electromagnetic assembly.

24. The timepiece according to claim 22, wherein the regulating device further comprises a timer associated with the logic control circuit to enable the latter to activate, if required, the load pump at a first given time since the appearance of a second voltage lobe, said first time being situated in a first time zone, or at a second given time since the appearance of a first voltage lobe, said second time being situated in a second time zone.

25. The timepiece according to claim 23, wherein the regulating device further comprises a timer associated with the logic control circuit to enable the latter to activate, if required, the load pump at a first given time since the appearance of a second voltage lobe, said first time being situated in a first time zone, or at a second given time since the appearance of a first voltage lobe, said second time being situated in a second time zone.

26. The timepiece according to claim 3, wherein the electromagnetic assembly comprises a pair of bipolar magnets mounted on a balance of the mechanical resonator and having two respective magnetization axes which are parallel with a geometric plane comprising the axis of rotation of the balance with opposite respective polarities, and the at least one coil which is rigidly connected to the support of the mechanical resonator, the two bipolar magnets of said pair being arranged on the balance such that the respective magnetic fluxes thereof pass through the at least one coil with a time-lag but with in part a simultaneity of the incoming magnetic flux and the outgoing magnetic flux such that an induced voltage pulse generated between the two ends of the at least one coil upon the passage of the pair of magnets facing the at least one coil exhibits a central lobe of maximum amplitude resulting from simultaneous coupling of the pair of magnets with the at least one coil; wherein a median half-axis starting from the axis of rotation of the balance and passing via the midpoint of the pair of bipolar magnets defines a reference half-axis when the resonator is at rest and thus in the neutral position thereof, the at least one coil exhibiting at the center thereof an angular lag relative to the reference half-axis so as to generate in each oscillation period of the mechanical resonator, in each effective functioning range, two central voltage lobes having opposite polarities and forming respectively said first voltage lobe and said second voltage lobe; and wherein said electric converter comprises a double-alternation rectifier arranged to be able to recharge the power supply capacitor upon the appearance of first voltage lobes and upon the appearance of second voltage lobes.

27. The timepiece according to claim 26, wherein said angular lag is between 30° and 120° in absolute values.

28. The timepiece according to claim 26, wherein the regulating device comprises at least one detection device, arranged to be able to detect the successive appearance of first voltage lobes or second voltage lobes.

29. The timepiece according to claim 28, wherein the regulating device further comprises a timer associated with the logic control circuit to enable the latter to activate, if required, the load pump at a first given time since the appearance of a second voltage lobe, said first time being situated in a first time zone, or at a second given time since the appearance of a first voltage lobe, said second time being situated in a second time zone.

30. The timepiece according to claim 26, wherein said pair of bipolar magnets is a first pair of bipolar magnets and said angular lag is a first angular lag, wherein the electromagnetic assembly further comprises a second pair of bipolar magnets similar to the first pair and also mounted on the balance of the mechanical resonator, the at least one coil exhibiting at the center thereof a second angular lag, relative to a reference half-axis defined by the second pair of magnets, the value whereof is equal to the first angular lag but of opposite direction, the two pairs of magnets being arranged such that the polarities of the magnets of the first pair exhibit a planar symmetry with the polarities of the magnets of the second pair relative to a plane passing via the center of the at least one coil and comprising the axis of rotation.

31. The timepiece according to claim 30, wherein the first and second angular lags each have an absolute value equal to 90°.

32. The timepiece according to claim 3, wherein the mechanical resonator comprises a balance-spring; and wherein said maintenance device comprises an escapement kinematically linked to a barrel equipped with a driving spring, the escapement being capable of supplying the balance-spring with a mechanical maintenance torque of the oscillations thereof.

33. The timepiece according to claim 3, wherein said electromagnetic assembly also partially forms the measuring device.

* * * * *